United States Patent
Imazeki

(10) Patent No.: US 10,248,271 B2
(45) Date of Patent: Apr. 2, 2019

(54) ELECTRONIC DEVICE

(71) Applicant: Japan Display Inc., Tokyo (JP)

(72) Inventor: Yoshikatsu Imazeki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/658,801

(22) Filed: Jul. 25, 2017

(65) Prior Publication Data

US 2018/0032175 A1 Feb. 1, 2018

(30) Foreign Application Priority Data

Jul. 29, 2016 (JP) .................................. 2016-149606

(51) Int. Cl.
  *G06F 3/044* (2006.01)
  *G06F 3/041* (2006.01)
  *G02F 1/1339* (2006.01)
  *G02F 1/1333* (2006.01)

(52) U.S. Cl.
  CPC ............ *G06F 3/044* (2013.01); *G02F 1/1339* (2013.01); *G06F 3/0412* (2013.01); *G02F 1/13338* (2013.01); *G02F 2001/133388* (2013.01); *G06F 2203/04103* (2013.01); *G06F 2203/04111* (2013.01)

(58) Field of Classification Search
  CPC ............... G02F 1/13338; G02F 1/1339; G02F 2001/133388; G06F 2203/04103; G06F 2203/04111; G06F 3/0412; G06F 3/044
  See application file for complete search history.

(56) References Cited

U.S. PATENT DOCUMENTS

| | | | |
|---|---|---|---|
| 10,034,374 B2 * | 7/2018 | Koide | H05K 1/115 |
| 2018/0031932 A1 * | 2/2018 | Koide | G02F 1/133345 |
| 2018/0031933 A1 * | 2/2018 | Osawa | B23K 26/0063 |
| 2018/0031934 A1 * | 2/2018 | Watanabe | B32B 7/12 |
| 2018/0031938 A1 * | 2/2018 | Watanabe | G02F 1/136286 |
| 2018/0031939 A1 * | 2/2018 | Imazeki | G02F 1/136286 |
| 2018/0032175 A1 * | 2/2018 | Imazeki | G02F 1/1339 |
| 2018/0032192 A1 * | 2/2018 | Watanabe | G06F 3/0412 |
| 2018/0032194 A1 * | 2/2018 | Koide | G06F 3/0412 |
| 2018/0032204 A1 * | 2/2018 | Imazeki | G06F 3/0416 |
| 2018/0033617 A1 * | 2/2018 | Imazeki | G02F 1/1345 |
| 2018/0033800 A1 * | 2/2018 | Koide | G06F 3/041 |
| 2018/0033801 A1 * | 2/2018 | Koide | G06F 3/0412 |
| 2018/0033969 A1 * | 2/2018 | Kamijo | G02F 1/1345 |
| 2018/0035540 A1 * | 2/2018 | Koide | G02F 1/133345 |
| 2018/0035541 A1 * | 2/2018 | Kamijo | G02F 1/136227 |

(Continued)

FOREIGN PATENT DOCUMENTS

JP  2002-40465 A  2/2002

*Primary Examiner* — Tony O Davis
(74) *Attorney, Agent, or Firm* — K&L Gates LLP

(57) ABSTRACT

According to one embodiment, an electronic device including a first substrate which includes a first basement, a first conductive layer, and a second conductive layer in contact with the first conductive layer, a second substrate which includes a second basement opposed to the first conductive layer and separated from the first conductive layer, a third conductive layer, and a first hole penetrating the second substrate, and a connecting material which electrically connects the second conductive layer and the third conductive layer via the first hole and directly contacts the second conductive layer.

13 Claims, 14 Drawing Sheets

(56) References Cited

U.S. PATENT DOCUMENTS

| | | | |
|---|---|---|---|
| 2018/0035542 A1* | 2/2018 | Osawa | H05K 1/144 |
| 2018/0088402 A1* | 3/2018 | Song | G02F 1/133514 |
| 2018/0120993 A1* | 5/2018 | Kurasawa | G06K 9/0002 |
| 2018/0210262 A1* | 7/2018 | Osawa | G02F 1/13452 |
| 2018/0212550 A1* | 7/2018 | Imazeki | H02P 29/40 |
| 2018/0213638 A1* | 7/2018 | Osawa | H05K 1/0298 |

* cited by examiner

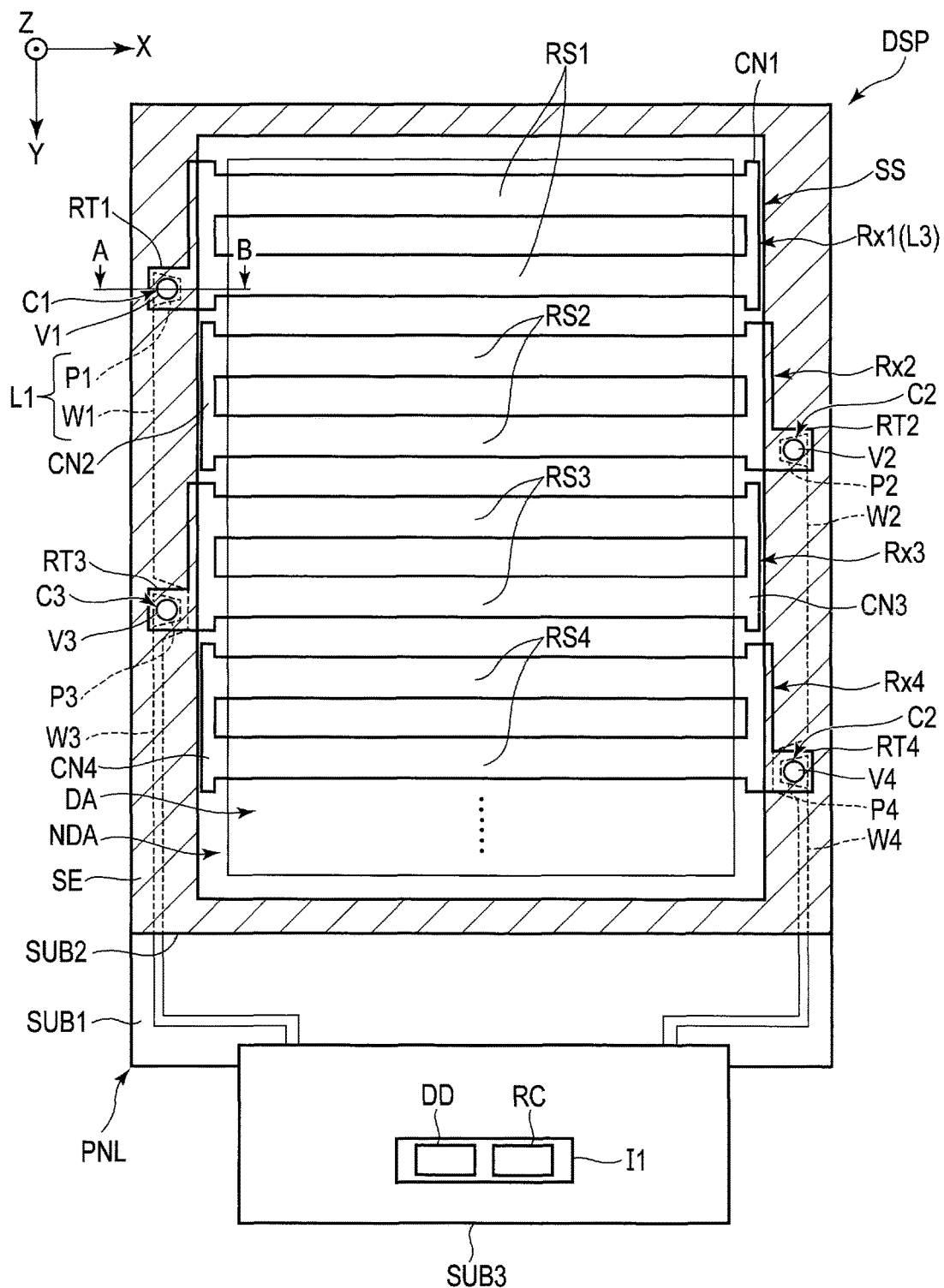
F I G. 1

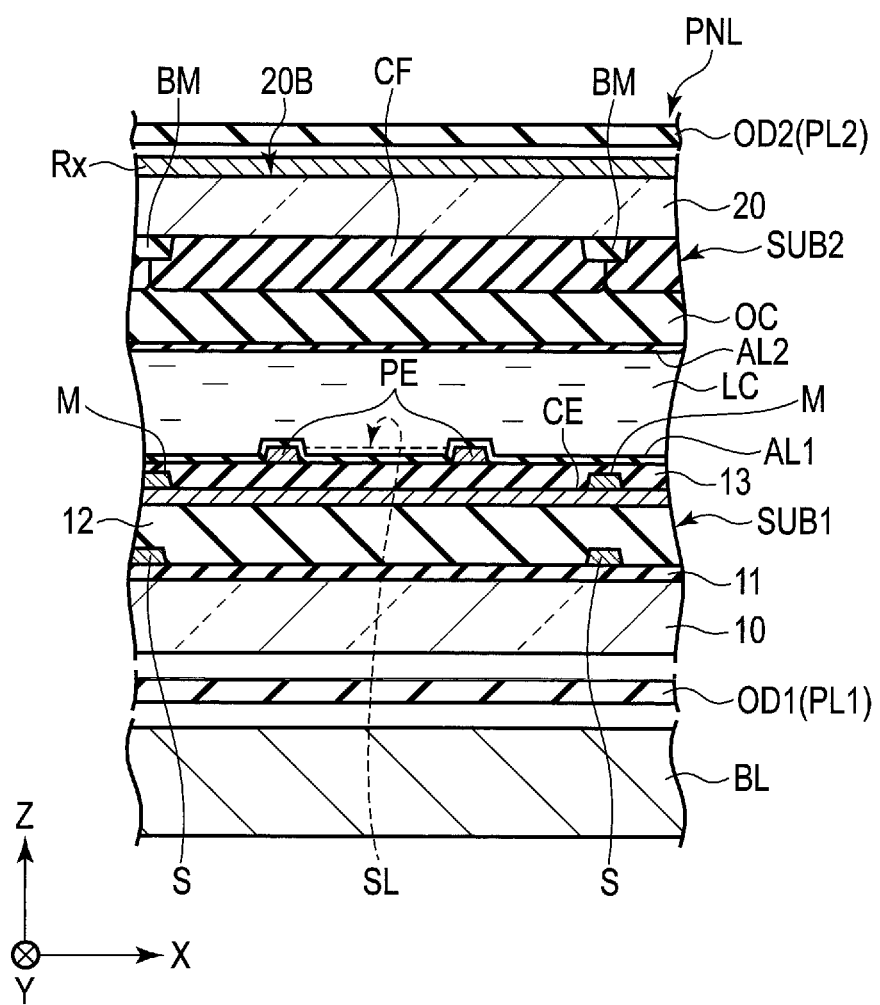
F I G. 3

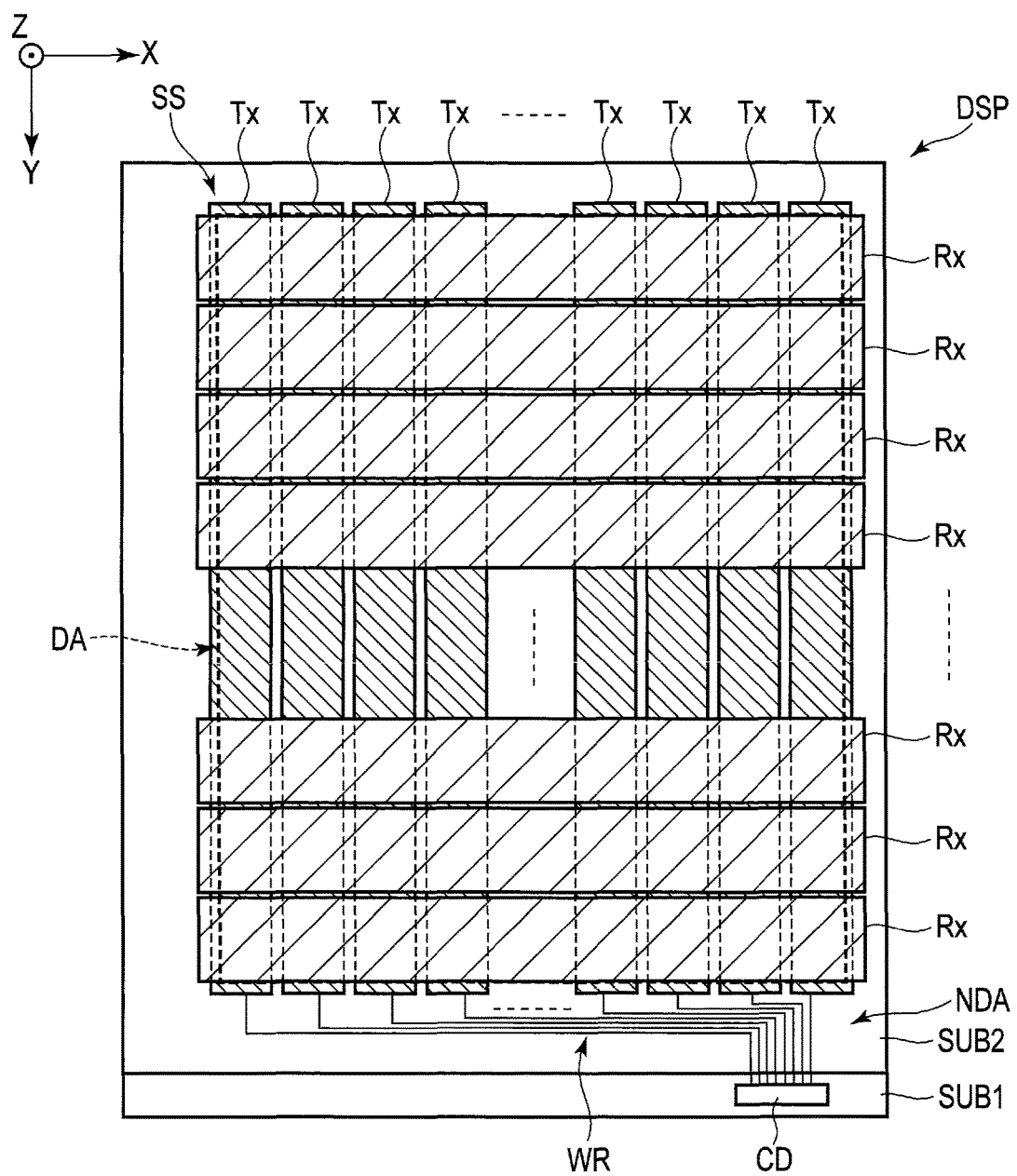
F I G. 4

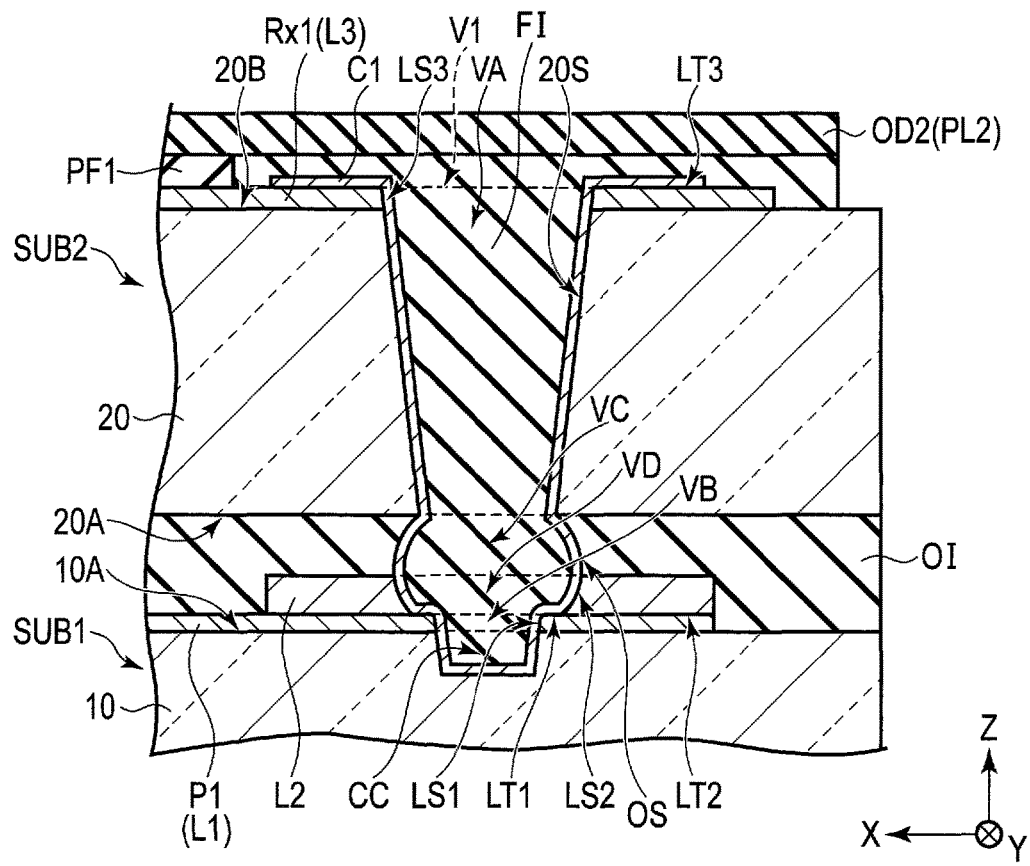
F I G. 6
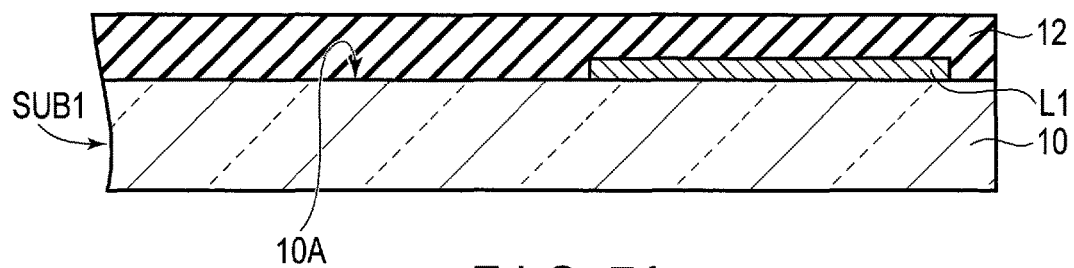
F I G. 7A

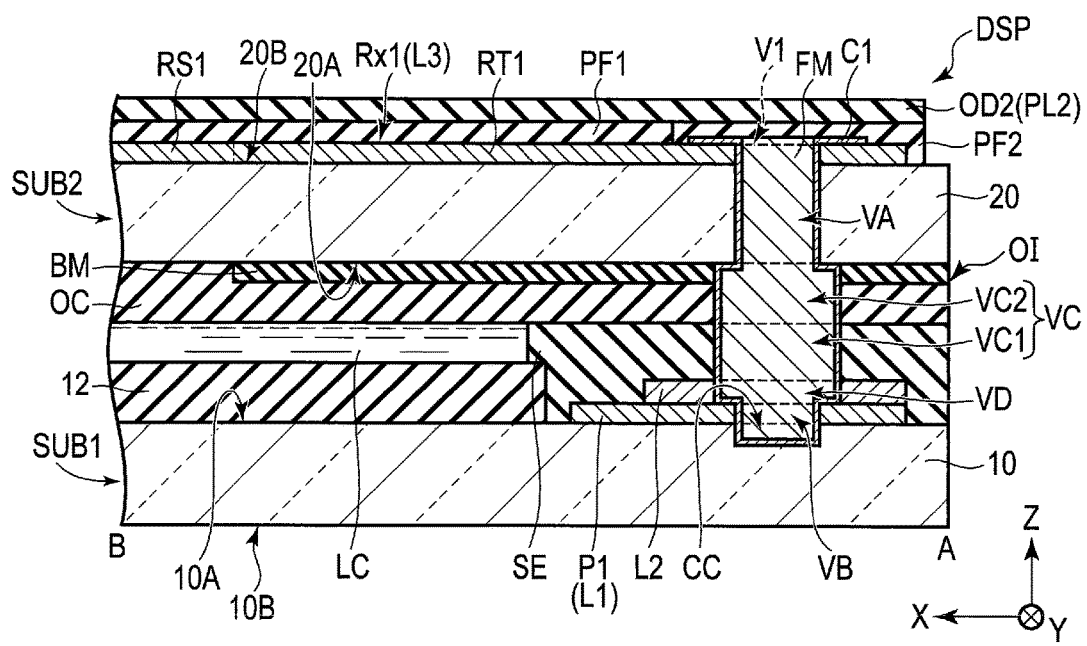
F I G. 13

ELECTRONIC DEVICE

CROSS-REFERENCE TO RELATED APPLICATIONS

This application is based upon and claims the benefit of priority from Japanese Patent Application No. 2016-149606, filed Jul. 29, 2016, the entire contents of which are incorporated herein by reference.

FIELD

Embodiments described herein relate generally to an electronic device.

BACKGROUND

In recent years, various techniques for narrowing a frame of a display device have been studied. For example, disclosed is a technique in which a wiring having a connector inside a hole penetrating an inner surface and an outer surface of a first substrate made of resin and a wiring provided on an inner surface of a second substrate made of resin are electrically connected to each other by another connector.

SUMMARY

The present disclosure relates generally to an electronic device.

In an embodiment, an electronic device is provided. The electronic device includes a first substrate which comprises a first basement, a first conductive layer, and a second conductive layer in contact with the first conductive layer; a second substrate which comprises a second basement opposed to the first conductive layer and separated from the first conductive layer, a third conductive layer, and a first hole penetrating the second substrate; and a connecting material which electrically connects the second conductive layer and the third conductive layer via the first hole and directly contacts the second conductive layer.

Additional features and advantages are described herein, and will be apparent from the following Detailed Description and the figures.

BRIEF DESCRIPTION OF THE DRAWINGS

FIG. 1 is a plan view illustrating a configuration example of a display device according to an embodiment;

FIG. 3 is a view illustrating a structure of a part of the display panel shown in FIG. 1;

FIG. 4 is a plan view illustrating a configuration example of a sensor SS;

FIG. 6 is an enlarged cross-sectional view illustrating a configuration example of a connection structure between a first substrate and a second substrate according to the embodiment;

FIG. 7A is a view for describing an example of a method of manufacturing the display device according to the embodiment;

FIG. 13 is a cross-sectional view illustrating another configuration example of the display device according to the embodiment.

DETAILED DESCRIPTION

Figure 2:
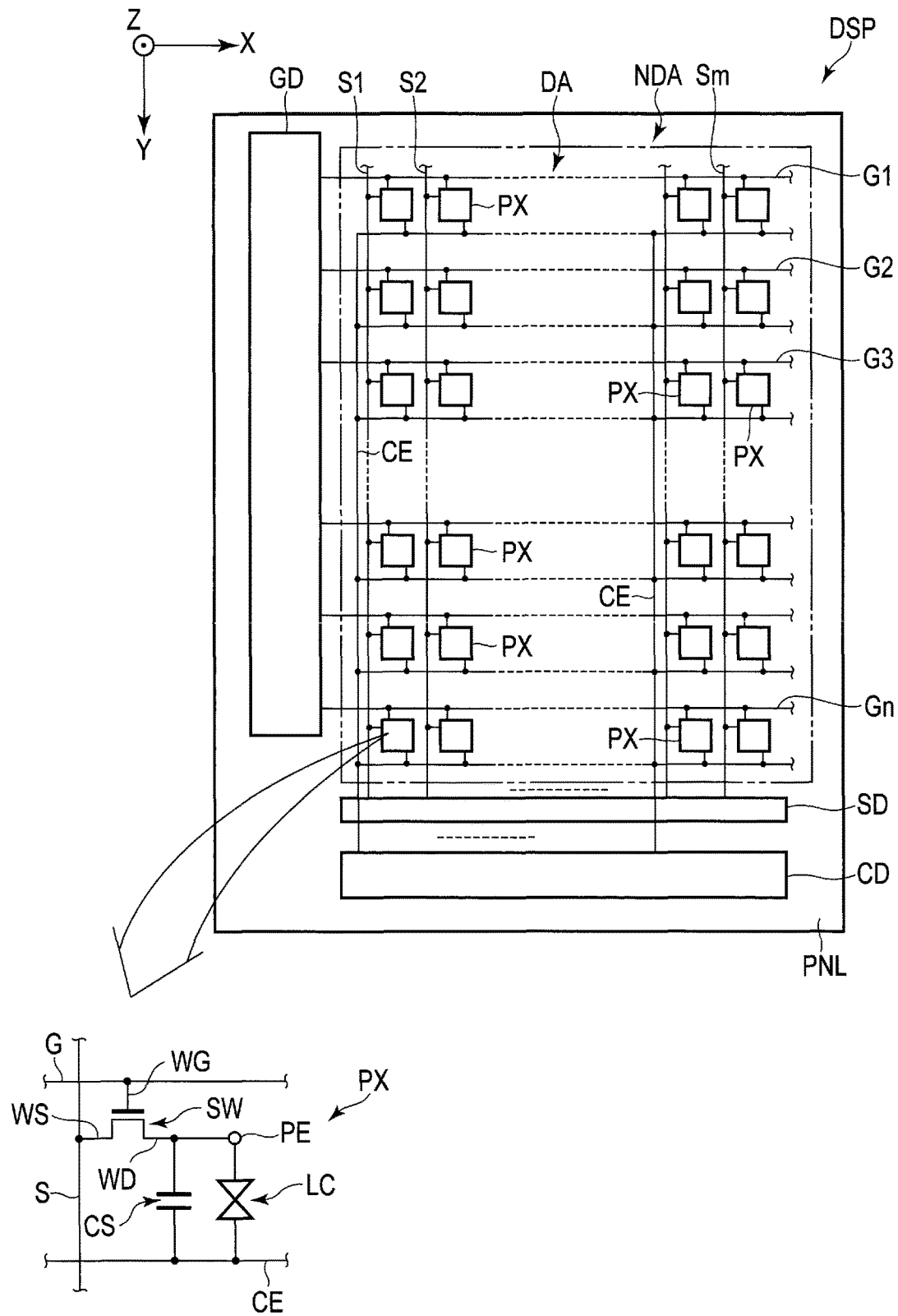
FIG. 2 is a diagram illustrating a basic configuration of a display panel shown in FIG. 1 and an equivalent circuit.

In general, according to one embodiment, an electronic device comprises: a first substrate which comprises a first basement, a first conductive layer, and a second conductive layer in contact with the first conductive layer; a second substrate which comprises a second basement opposed to the first conductive layer and separated from the first conductive layer, a third conductive layer, and a first hole penetrating the second substrate; and a connecting material which electrically connects the second conductive layer and the third conductive layer via the first hole and directly contacts the second conductive layer.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, structural elements equivalent or similar to those described in connection with preceding figures are denoted by the same reference numbers and their detailed descriptions may be omitted unless necessary, in the specification and drawings.

In the embodiment, a display device is disclosed as an example of an electronic device. This display device can be used for various devices, for example, a smartphone, a tablet terminal, a mobile phone terminal, a notebook-type personal computer, a game machine, and the like. A principal configuration disclosed in the embodiment can be applied in a liquid crystal display device, a self-luminous display device such as an organic electroluminescent display device, an electronic paper-type display device including an electrophoretic element and the like, a display to which micro electro mechanical systems (MEMS) are applied, or a display device to which electrochromism is applied.

FIG. 1 is a plan view illustrating a configuration example of a display device DSP according to the embodiment. Here, a liquid crystal display device equipped with a sensor SS will be described as an example of the display device DSP. A first direction X, a second direction Y, and a third direction Z are orthogonal to each other, but they may intersect each other at an angle other than 90 degrees. The first direction X and the second direction Y correspond to directions parallel to a surface of a substrate forming the display device DSP and the third direction Z corresponds to a thickness direction of the display device DSP. Here, a plan view of the display device DSP in an X-Y plane defined by the first direction X and the second direction Y is illustrated. In the following description, to view the X-Y plane from the third direction Z will be referred to as a plan view.

The display device DSP includes a display panel PNL, an IC chip I1, a wiring board SUB3, and the like. The display panel PNL is a liquid crystal display panel, and includes a first substrate SUB1, a second substrate SUB2, a seal SE, and a display function layer (a liquid crystal layer LC to be described later). The second substrate SUB2 is opposed to the first substrate SUB1. The seal SE corresponds to a part indicated by oblique lines ascending to the right in FIG. 1, and bonds the first substrate SUB1 and the second substrate SUB2 to each other. In the following description, a direction from the first substrate SUB1 toward the second substrate SUB2 in a direction perpendicular to the X-Y plane, for example, in the third direction Z will be referred to as an upper side (or simply above), and a direction from the second substrate SUB2 toward the first substrate SUB1 will be referred to as a lower side (or simply below). The display panel PNL may be any type, for example, among a transmissive type having a transmissive display function of displaying an image by selectively transmitting light from the lower side of the first substrate SUB1, a reflective type having a reflective display function of displaying an image by selectively reflecting light from the upper side of the second substrate SUB2, or a transflective type having the transmissive display function and the reflective display function.

The display panel PNL includes a display area DA to display an image and a frame-shaped non-display area NDA surrounding the display area DA. The display area DA corresponds to, for example, a first area, and is located at an inner side that is surrounded by the seal SE. The non-display area NDA corresponds to, for example, a second area adjacent to the display area (first area) DA. The seal SE is located in the non-display area NDA.

The IC chip I1 is mounted on the wiring board SUB3. It should be noted that the IC chip I1 is not limited to the example illustrated in the drawing and may be mounted over the first substrate SUB1 extending to an outer side of the second substrate SUB2 or mounted over an external circuit board connected to the wiring board SUB3. For example, a display driver DD which outputs a signal necessary to display the image is incorporated in the IC chip I1. Here, the display driver DD includes at least a part of a signal line driving circuit SD, a scanning line driving circuit GD, and a common electrode driving circuit CD which will be described later. In addition, a detection circuit RC functioning as a touch panel controller and the like is incorporated in the IC chip I1 in the example illustrated in the drawing. The detection circuit RC may be incorporated in another IC chip different from the IC chip I1.

The sensor SS performs sensing for detection of contact or approach of an object to be detected to the display device DSP. The sensor SS is provided with a plurality of detection electrodes Rx (Rx1, Rx2, Rx3, Rx4, and so on). Each of the plurality of detection electrodes Rx is provided in the second substrate SUB2. The respective detection electrodes Rx extend in the first direction X and are aligned with an interval in the second direction Y.

Each of the plurality of detection electrodes Rx (Rx1, Rx2, Rx3, Rx4, and so on) includes a detector RS (RS1, RS2, RS3, RS4, and so on) and a terminal RT (RT1, RT2, RT3, RT4, and so on), and a connection module CN (CN1, CN2, CN3, CN4, and so on).

The respective detectors RS are located in the display area DA and extend in the first direction X. In the detection electrode Rx, the detector RS is mainly used for sensing. In the example illustrated in the drawing, each of the detectors RS is illustrated on a strip, and more specifically, is formed by an aggregate of fine metal wires. Each of the detection electrodes Rx includes two detectors RS in the example illustrated in the drawing, but may include three or more detectors RS or one detector RS. Hereinafter, these detection electrodes Rx will be referred to as a third conductive layer in some cases.

The plurality of terminals RT are connected to the detectors RS, respectively. In the example illustrated in the drawing, the respective terminals RT1, RT3, and so on of the odd-numbered detection electrodes Rx1, Rx3, and so on are located at one end side portion (first side portion) of the non-display area NDA. In addition, the respective terminals RT2, RT4, and so on of the even-numbered detection electrodes Rx2, Rx4, and so on are all located over the other end side portion (second side portion) of the non-display area NDA. In the first direction X, a direction in which the terminals RT1, RT3, and so on of the odd-numbered detection electrodes Rx1, Rx3, and so on are provided is referred to as left (left side), a direction opposite to the left direction (direction in which the terminals RT2, RT4, and so on of the even-numbered detection electrodes Rx2, Rx4, and so on are provided) is referred to as right (right side). In FIG. 1, the first side portion corresponds to an area on the left side of the display area DA, and the second side portion corresponds to an area on the right side of the display area DA. A part of the terminal RT is formed at a position overlapping the seal SE in a plan view.

On the other hand, the first substrate SUB1 includes a plurality of pads P (P1, P2, P3, P4, and so on) and a plurality of wirings W (W1, W2, W3, W4, and so on). In the example illustrated in the drawing, the odd-numbered pads P1, P3, and so on and wirings W1, W3, and so on are all located in the first side portion of the non-display area NDA. In addition, the even-numbered pads P2, P4, and so on and wirings W2, W4, and so on are all located on the second side portion of the non-display area NDA. Each of the pad P and the wiring W overlaps the seal SE in a plan view. Each of the pads P is formed at a position overlapping the corresponding terminal RT in a plan view. In the example illustrated in the drawing, each of the pads P is formed in a trapezoidal shape when viewed in a plan view. It should be noted that each of the pads P may have a shape other than the trapezoidal shape, for example, a polygonal shape, a circular shape, an elliptical shape, or the like when viewed in a plan view. Each of the wirings W is connected to the pad P, extends along the second direction, and is electrically connected to the detection circuit RC of the IC chip I1 via the wiring board SUB3. Hereinafter, these pads P will be referred to as a first conductive layer in some cases.

As illustrated in the drawing, in the layout in which the pad P3 is disposed closer to the wiring board SUB3 than the pad P1, the wiring W1 bypasses the inner side of the pad P3 (that is, the direction in which the display area DA is provided) and is disposed between the pad P3 and the wiring board SUB3 side by side with the wiring W3 at the inner side of the wiring W3. In the same manner, the wiring W2 bypasses the inner side of the pad P4 and is disposed between the pad P4 and the wiring board SUB3 side by side with the wiring W4 at the inner side of the wiring W4.

A plurality of contact holes V (V1, V2, V3, V4, and so on) are formed, respectively, at positions at which the terminals RT (RT1, RT2, RT3, RT4, and so on) and the pads P (P1, P2, P3, P4, and so on) oppose each other. In addition, it is possible to form each of the plurality of contact holes V to penetrate the second substrate SUB2 including the terminal RT, and the seal SE and penetrate even the pad P. Each of the plurality of contact holes V has a circular shape in a plan view in the example illustrated in the drawing, but the shape thereof is not limited to the example illustrated in the drawing and may be another shape such as an elliptical shape. Connecting materials C (C1, C2, C3, C4, and so on) are provided in the plurality of contact holes V, respectively. The connecting materials C electrically connects the terminals RT and the pads P, respectively. That is, each of the plurality of detection electrodes Rx provided in the second substrate SUB2 is electrically connected to the detection circuit RC of the wiring board SUB3 which is connected to the pad P of the first substrate SUB1, via the connecting material C. The detection circuit RC reads a sensor signal output from each of the plurality of detection electrodes Rx and detects presence or absence of contact or approach of the object to be detected, a position coordinate of the object to be detected, and the like.

According to the layout of the display device DSP as described above, a width of the first side portion and a width of the second side portion in the non-display area NDA can be equalized, which is suitable for narrowing the frame.

FIG. 2 is a diagram illustrating a basic configuration of the display panel PNL shown in FIG. 1 and an equivalent circuit. The display panel PNL includes a plurality of pixels PX in the display area DA. Here, the pixel indicates a minimum unit that can be individually controlled according to a pixel signal, and for example, is present in an area including a switching element disposed at a position where a scanning line and a signal line, which will be described later, cross each other. The plurality of pixels PX are disposed in a matrix in the first direction X and the second direction Y. In addition, the display panel PNL includes a plurality of scanning lines G (G1 to Gn), a plurality of signal lines S (S1 to Sm), a common electrode CE, and the like in the display area DA. The scanning lines G extend in the first direction X and are aligned in the second direction Y. The signal lines S each extend in the second direction Y and are aligned in the first direction X. It should be noted that the scanning line G and the signal line S do not necessarily extend linearly, and each part thereof may be bent. The common electrode CE is disposed over the plurality of pixels PX. Each of the scanning line G, the signal line S, and the common electrode CE is led in the non-display area NDA. In the non-display area NDA, the scanning line G is connected to the scanning line driving circuit GD, the signal line S is connected to the signal line driving circuit SD, and the common electrode CE is connected to the common electrode driving circuit CD. The signal line driving circuit SD, the scanning line driving circuit GD, and the common electrode driving circuit CD may be formed over the first substrate SUB1, or some or all of these circuits may be incorporated in the IC chip I1 shown in FIG. 1.

Each of the pixels PX includes a switching element SW, a pixel electrode PE, the common electrode CE, a liquid crystal layer LC, and the like. The switching element SW is configured, for example, using a thin film transistor (TFT), and is electrically connected to the scanning line G and the signal line S. More specifically, the switching element SW includes a gate electrode WG, a source electrode WS, and a drain electrode WD. The gate electrode WG is electrically connected to the scanning line G. In the example illustrated in the drawing, an electrode electrically connected to the signal line S is referred to as the source electrode WS, and an electrode electrically connected to the pixel electrode PE is referred to as the drain electrode WD.

The scanning line G is connected to the switching element SW in each of the pixels PX aligned in the first direction X. The signal line S is connected to the switching element SW in each of the pixels PX aligned in the second direction Y. Each of the pixel electrodes PE is opposed to the common electrode CE and drives the liquid crystal layer LC by an electric field generated between the pixel electrode PE and the common electrode CE. A storage capacitor CS is formed, for example, between the common electrode CE and the pixel electrode PE.

FIG. 3 is a cross-sectional view illustrating a structure of a part of the display panel PNL shown in FIG. 1. Here, the cross-sectional view of the display device DSP taken along the first direction X is illustrated.

The illustrated display panel PNL has a configuration corresponding to a display mode in which a lateral electric field, substantially parallel to the surface of the substrate is mainly used. It should be noted that the display panel PNL may have a configuration corresponding to a display mode in which a vertical electric field vertical to the surface of the substrate is used, an electric field in an oblique direction to the surface of the substrate is used, or both the electric fields are combinedly used. In the display mode of using the lateral electric field, for example, it is possible to apply a configuration in which both the pixel electrode PE and the common electrode CE are provided on any one of the first substrate SUB1 and the second substrate SUB2. In the display mode of using the vertical electric field and the oblique electric field, for example, it is possible to apply a configuration in which any one of the pixel electrode PE and the common electrode CE is provided in the first substrate SUB1 and the other one of the pixel electrode PE and the common electrode CE is provided in the second substrate SUB2. It should be noted that the substrate surface here is a surface parallel to the X-Y plane.

The first substrate SUB1 includes a first basement 10, the signal line S, the common electrode CE, a metal layer M, the pixel electrode PE, a first insulating layer 11, a second insulating layer 12, a third insulating layer 13, a first alignment film AL1, and the like. Here, the switching element, the scanning line, various insulating layers interposed therebetween and the like are not illustrated.

The first insulating layer 11 is located on the first basement 10. The scanning line and a semiconductor layer of the switching element (not illustrated) are located between the first basement 10 and the first insulating layer 11. The signal line S is located on the first insulating layer 11. The second insulating layer 12 is located on the signal line S and the first insulating layer 11. The common electrode CE is located on the second insulating layer 12. The metal layer M contacts the common electrode CE immediately above the signal line S. The metal layer M is located on the common electrode CE in the example illustrated in the drawing, but may be located between the common electrode CE and the second insulating layer 12. The third insulating layer 13 is located on the common electrode CE and the metal layer M. The pixel electrode PE is located on the third insulating layer 13. The pixel electrode PE is opposed to the common electrode CE via the third insulating layer 13. In addition, the pixel electrode PE has a slit SL at a position opposed to the common electrode CE. The first alignment film AL1 covers the pixel electrode PE and the third insulating layer 13.

The scanning line, the signal line S, and the metal layer M are formed using a metal material such as molybdenum, tungsten, titanium, and aluminum, and may have a single-layer structure or a multilayer structure. The common electrode CE and the pixel electrode PE are formed using a transparent conductive material such as ITO and IZO. The first insulating layer 11 and the third insulating layer 13 are inorganic insulating layers, and the second insulating layer 12 is an organic insulating layer.

The configuration of the first substrate SUB1 is not limited to the example illustrated in the drawing, and the pixel electrode PE may be located between the second insulating layer 12 and the third insulating layer 13, and the common electrode CE may be located between the third insulating layer 13 and the first alignment film AL1. In such a case, the pixel electrode PE is formed in a flat plate shape without a slit, and the common electrode CE has a slit opposed to the pixel electrode PE. In addition, both of the pixel electrode PE and the common electrode CE may be formed in a comb-teeth shape and disposed so as to be engaged with each other.

The second substrate SUB2 includes a second basement 20, a light shielding layer BM, a color filter CF, an overcoat layer OC, a second alignment film AL2, and the like.

The light shielding layer BM and the color filter CF are located on a side of the second basement 20 opposed to the first substrate SUB1. The light shielding layer BM partitions the respective pixels and is located immediately above the signal line S. The color filter CF is opposed to the pixel electrode PE, and a part thereof overlaps the light shielding layer BM. The color filter CF includes a red color filter, a green color filter, a blue color filter, and the like. The overcoat layer OC covers the color filter CF. The second alignment film AL2 covers the overcoat layer OC.

It should be noted that the color filter CF may be disposed in the first substrate SUB1. The color filter CF may include color filters of four or more colors. For pixels displaying white, a white color filter may be disposed, an uncolored resin material may be disposed, or the overcoat layer OC may be disposed without disposing a color filter.

The detection electrode Rx is located on a surface 20B of the second basement 20. The detection electrode Rx may be formed using a conductive layer containing a metal or a transparent conductive material such as ITO and IZO, a transparent conductive layer may be stacked over a conductive layer containing metal. The detection electrode Rx may be formed using a conductive organic material, a dispersion of a fine conductive material, or the like.

A first optical element OD1 including a first polarizing plate PL1 is located between the first basement 10 and an illumination device BL. A second optical element OD2 including a second polarizing plate PL2 is located above the detection electrode Rx. The first optical element OD1 and the second optical element OD2 may include a retardation plate if necessary.

Next, a configuration example of the sensor SS mounted over the display device DSP according to the embodiment will be described. The sensor SS to be described hereinafter is, for example, an electrostatic capacitance type of a mutual capacitance type, and detects contact or approach of the object to be detected based on a change in electrostatic capacitance between a pair of electrodes opposed to each other via a dielectric.

FIG. 4 is a plan view illustrating a configuration example of the sensor SS.

In the configuration example illustrated in the drawing, the sensor SS includes a sensor drive electrode Tx and the detection electrode Rx. In the example illustrated in the drawing, the sensor drive electrode Tx corresponds to a part indicated by oblique lines descending to the right and is provided in the first substrate SUB1. In addition, the detection electrode Rx corresponds to a part indicated by oblique lines ascending to the right and is provided in the second substrate SUB2. The sensor drive electrode Tx and the detection electrode Rx cross each other in the X-Y plane. The detection electrode Rx is opposed to the sensor drive electrode Tx in the third direction Z.

The sensor drive electrode Tx and the detection electrode Rx are located in the display area DA, and each part thereof extends to the non-display area NDA. In the example illustrated in the drawing, the respective sensor drive electrodes Tx have a strip shape extending in the second direction Y and are disposed at an interval in the first direction X. The respective detection electrodes Rx extend in the first direction X and are disposed at an interval in the second direction Y. As described with reference to FIG. 1, the detection electrode Rx is connected to the pad provided in the first substrate SUB1 and is electrically connected to the detection circuit RC via the wiring. Each of the sensor drive electrodes Tx is electrically connected to the common electrode driving circuit CD via a wiring WR. Each number, size, and shape of the sensor drive electrodes Tx and the detection electrodes Rx are not particularly limited, and can be variously changed.

The sensor drive electrode Tx includes the above-described common electrode CE, has a function of generating an electric field with the pixel electrode PE, and has a function of detecting a position of the object to be detected by generating a capacitance with the detection electrode Rx.

The common electrode driving circuit CD supplies a common drive signal to the sensor drive electrode Tx including the common electrode CE at the time of display driving to display an image in the display area DA. In addition, the common electrode driving circuit CD supplies a sensor drive signal to the sensor drive electrode Tx at the time of sensing driving to perform sensing. In accordance with the supply of the sensor drive signal to the sensor drive electrode Tx, the detection electrode Rx outputs a sensor signal necessary for sensing (that is, a signal based on a change in inter-electrode capacitance between the sensor drive electrode Tx and the detection electrode Rx). The detection signal output from the detection electrode Rx is input to the detection circuit RC shown in FIG. 1.

The sensor SS in the above-described configuration example is not limited to the mutual capacitance type, which detects the object to be detected based on the change in the electrostatic capacitance between the pair of electrodes (in the above-described example, the electrostatic capacitance between the sensor drive electrode Tx and the detection electrode Rx), but may be a self-capacitance type which detects the object to be detected is detected based on a change in electrostatic capacitance of the detection electrode Rx.

Figure 5:
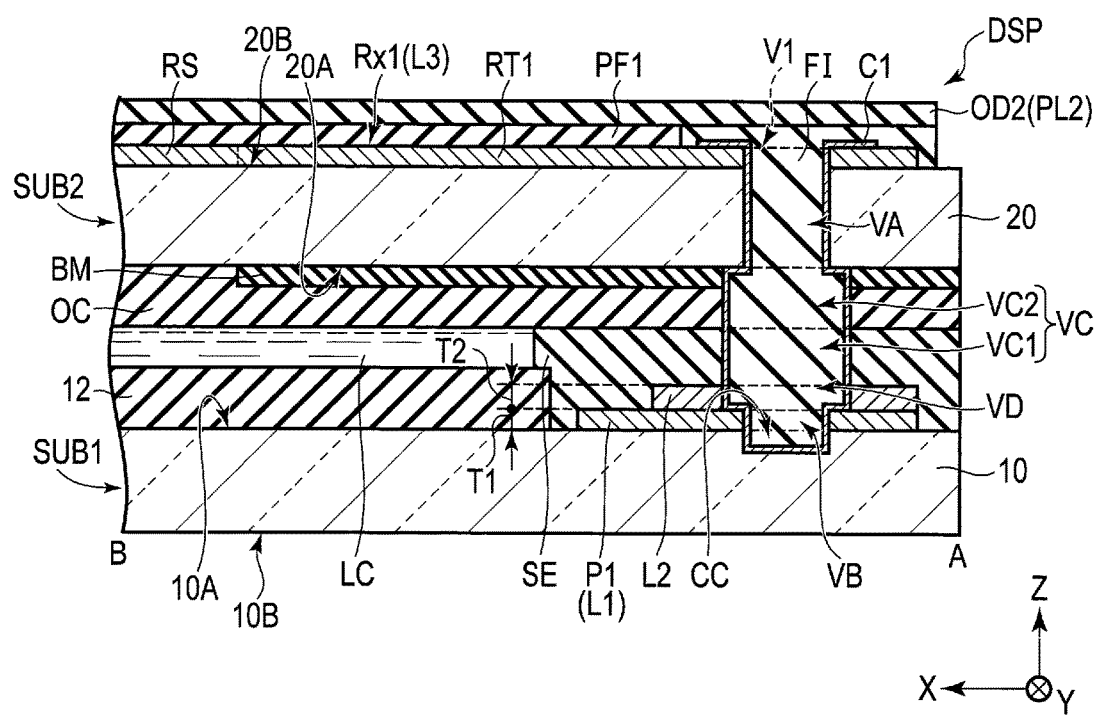
FIG. 5 is a cross-sectional view illustrating a structure of a part of the display device taken along line A-B shown in FIG. 1.

FIG. 5 is a cross-sectional view illustrating a structure of a part of the display device DSP taken along line A-B shown in FIG. 1. FIG. 5 illustrates a configuration example in which the structure shown in FIG. 3 is simplified, for convenience of description. Hereinafter, the contact hole V1 will be described among the plurality of contact holes V formed in the display device DSP, for convenience of description.

In FIG. 5, the display device DSP includes the first substrate SUB1, the second substrate SUB2, the seal SE, the liquid crystal layer LC, the connecting material C1, and the wiring board SUB3. The first substrate SUB1 and the second substrate SUB2 are opposed to each other in the third direction Z.

The first substrate SUB1 includes the first basement 10, the pad P1 (hereinafter, referred to as a first conductive layer L1), a second conductive layer L2 in contact with the first conductive layer L1, and the second insulating layer 12. The first basement 10 has a surface 10A opposed to the second substrate SUB2 and a surface 10B opposite to the surface 10A. In the example illustrated in the drawing, the first conductive layer L1 is located on the surface 10A. That is, the first conductive layer L1 is located on the side of the first basement 10 opposed to the second substrate SUB2. The second conductive layer L2 is located on the first conductive layer L1. In the example illustrated in the drawing, a thickness T2 of the second conductive layer L2 is greater than a thickness T1 of the first conductive layer L1. For example, the thickness T1 of the first conductive layer L1 the thickness T2 of the second conductive layer L2 are in the order of several micrometers, and the thickness T2 is three to four times the thickness T1. In the example illustrated in the drawing, the second insulating layer 12 is located on the surface 10A of the first basement 10 similarly to the first conductive layer L1, is separated from the first conductive layer L1 in the first direction X, and does not overlap with the first conductive layer L1. Although the second conductive layer L2 is located on the first conductive layer L1, the entire second conductive layer L2 may be located on the first conductive layer L1, or a part of the second conductive layer L2 may be disposed over the first conductive layer L1. In addition, various insulating layers and various conductive layers may be disposed between the first basement 10 and the first conductive layer L1 although not illustrated. Various insulating layers and various conductive layers may be also disposed between the first conductive layer L1 and the second conductive layer L2. In addition, various insulating layers and various conductive layers may be also disposed over the second conductive layer L2. Further, the first insulating layer 11 illustrated in FIG. 3, various insulating layers, and various conductive layers may be also disposed between the surface 10A of the first basement 10 and the second insulating layer 12. In addition, the second insulating layer 12 is separated from the first conductive layer L1, but may be extended to an end of the surface 10A of the first basement 10 in the direction of the first conductive layer L1 in the first direction X such that a part thereof may be located on the surface 10A and the first conductive layer L1. For example, the second insulating layer 12 may be located on the first basement 10, and a part of the second insulating layer 12 may cover the first conductive layer L1 and the second conductive layer L2.

The second substrate SUB2 includes the second basement 20, the light shielding layer BM, the overcoat layer OC, the detection electrode Rx1 (hereinafter, referred to as a third conductive layer L3), a protective material PF1, and the second optical element OD2 including the second polarizing plate PL2. The second basement 20 has a surface 20A opposed to the first substrate SUB1 and a surface 20B opposite to the surface 20A. The light shielding layer BM is located below the surface 20A of the second basement 20. The overcoat layer OC is located below the light shielding layer BM. The surface 20A of the second basement 20 is opposed to the second conductive layer L2 via the light shielding layer BM and the overcoat layer OC, and is separated from the second conductive layer L2. In the example illustrated in the drawing, the third conductive layer L3 is located on the surface 20B. The protective material PF1 is located on the third conductive layer L3. For example, the protective material PF1 is formed using an organic insulating material such as acrylic resin. In the example illustrated in the drawing, the second optical element OD2 including the second polarizing plate PL2 is located on the protective material PF1. Although not illustrated, various insulating layers and various conductive layers may be disposed between the second basement 20 and the third conductive layer L3. In addition, various insulating layers and various conductive layers may be also disposed between the third conductive layer L3 and the protective material PF1. Further, various insulating layers and various conductive layers may be also disposed between the protective material PF1 and the second optical element OD2. In addition, the surface 20A of the second basement 20 is separated from the second conductive layer L2, but the surface 20A may be in contact with the second conductive layer L2.

The material of the first basement 10 and the second basement 20 is, for example, glass, more specifically, alkali-free glass. For example, the first conductive layer L1 and the third conductive layer L3 are formed using a metal material such as molybdenum, tungsten, titanium, aluminum, silver, copper, and chromium, an alloy obtained by combining these metallic materials, a transparent conductive material such as indium tin oxide (ITO) and indium zinc oxide (IZO), or the like, and may have a single-layer structure or a multilayer structure. The second conductive layer L2 is formed using a conductive metal material. For example, the second conductive layer L2 is formed using a paste-like conductive material of silver or an alloy containing silver. It should be noted that the second conductive layer L2 may be made of the same material as the connecting material C1 to be described later. The protective material PF1 is formed, for example, using an organic insulating material such as acrylic resin.

The seal SE is located between the first substrate SUB1 and the second substrate SUB2. In the example illustrated in the drawing, the seal SE is located between the overcoat layer OC and the surface 10A of the first basement 10, and a part thereof covers the first conductive layer L1 and the second conductive layer L2. The liquid crystal layer LC is located in a gap between the first substrate SUB1 and the second substrate SUB2. Although not illustrated, the metal layer M, the third insulating layer 13, and the first alignment film AL1 shown in FIG. 3 may be located above the second insulating layer 12. In addition, the second alignment film AL2 shown in FIG. 3 may be interposed between the overcoat layer OC and the seal SE. Hereinafter, the light shielding layer BM, the overcoat layer OC, and the seal SE interposed between the first basement 10 and the second basement 20 will be referred to as an organic insulating layer OI. In the example illustrated in the drawing, the organic insulating layer OI is located between the first basement 10 and the second basement 20, and covers the first conductive layer L1 and the second conductive layer L2. It should be noted that the organic insulating layer OI may include the second insulating layer 12, a color filter, an alignment film, and the like.

In the second substrate SUB2, the second basement 20 has a hole (first hole) VA penetrating between the surface 20A and the surface 20B. In the example illustrated in the drawing, the hole VA also penetrates the third conductive layer L3. On the other hand, in the first substrate SUB1, the first conductive layer L1 has a hole (second hole) VB at a position opposed to a position of the hole VA of the second basement 20 in the third direction Z. In the example illustrated in the drawing, the hole VB is aligned on the same straight line as the hole VA in the third direction Z. In addition, the first basement 10 has a recess CC at a position opposed to a position of the hole VB of the first conductive layer L1 in the third direction Z. The recess CC is formed from the surface 10A toward the surface 10B, and does not penetrate up to the surface 10B in the example illustrated in the drawing. For example, a depth of the recess CC along the third direction Z is about ⅕ to ½ of a thickness of the first basement 10 along the third direction Z. It should be noted that the first basement 10 may have a hole penetrating between the surface 10A and the surface 10B instead of the recess CC.

The organic insulating layer OI has a hole (third hole) VC led to the hole VA. In the example illustrated in the drawing, the hole VC is aligned on the same straight line as the holes VA and VB and the recesses CC in the third direction Z. The hole VC has a first portion VC1 penetrating the seal SE and a second portion VC2 penetrating the light shielding layer BM and the overcoat layer OC. The second conductive layer L2 has a hole (fourth hole) VD led to the hole VC and the hole VB. In the example illustrated in the drawing, the hole VD is aligned on the same straight line as the holes VA, VB and VC and the recesses CC in the third direction Z. In the example illustrated in the drawing, the holes VC and VD are expanded in the first direction X, respectively, as compared to the holes VA and VB. The holes VC and VD are expanded not only in the first direction X but in all directions inside the X-Y plane, respectively, as compared to the holes VA and VB. That is, the holes VC and VD have larger hole diameters than the holes VA and VB, respectively. In addition, the hole VB has a smaller hole diameter than the hole VD Any of the hole VB, the hole VC, the hole VD, and the recess CC is located immediately below the hole VA. The hole VA, the hole VB, the hole VC, the hole VD, and the recess CC are located on the same straight line along the third direction Z and form the contact hole V1. Although it has been described that the holes VC and VD are expanded in the first direction X, respectively, as compared to the holes VA and VB, the holes VC and VD may be configured so as not to be expanded in the first direction X.

The connecting material C1 is provided inside the contact hole V1 and electrically connects the first conductive layer L1, the second conductive layer L2, and the third conductive layer L3. It is desirable that the connecting material C1 be formed using a metal material such as silver and contain fine particles whose particle diameter is in the order of several nanometers to several tens of nanometers. In the example illustrated in the drawing, filler FI is filled in a hollow portion inside the connecting material C1 in the contact hole V1 in order to protect the connecting material C1. A part of the filler FI overflows from an upper side of the contact hole V1 and is located on the surface 20B of the second basement 20, the third conductive layer L3, and the connecting material C1. The filler FI is formed using, for example, an organic insulating material. The filler FI does not necessarily overflow above the contact hole V1. In this case, the protective material PF1 may be located over the filler FI. In addition, when the hollow portion is not formed inside the connecting material C1, the filler FI is not necessarily provided.

FIG. 6 is an enlarged cross-sectional view illustrating a configuration example of a connection structure between the first substrate SUB1 and the second substrate SUB2 according to the embodiment. With reference to FIG. 6, a connection structure among the first conductive layer L1, the second conductive layer L2, and the third conductive layer L3 according to the embodiment will be described in detail.

In FIG. 6, an upper surface of the third conductive layer L3 is referred to as an upper surface LT3, a surface of an inner peripheral portion of a hole formed in the third conductive layer L3 is referred to as an inner surface LS3, and a surface of an inner peripheral portion of a hole formed in the second basement 20 Is referred to as an inner surface 20S. An inner surface of the hole VA is formed of the inner surface LS3 of the hole of the third conductive layer L3 and the inner surface 20S of the hole of the second basement 20. A surface of an inner peripheral portion of the hole VB formed in the first conductive layer L1 is referred to as an inner surface LS1. A surface of an inner peripheral portion of the hole VC formed in the organic insulating layer OI is referred to as an inner surface OS. A surface of an inner peripheral portion of the hole VD formed in the second conductive layer L2 is referred to as an inner surface LS2. The inner surface LS2 of the second conductive layer is exposed in the hole VD. In the hole VD, the upper surface of the first conductive layer L1 exposed in a range expanded to the X-Y plane is referred to as an upper surface LT1. In the first substrate SUB1, an upper surface of the first conductive layer L1 in contact with the second conductive layer L2 is referred to as an upper surface LT2. In the example illustrated in the drawing, the inner surface of the contact hole V1 includes the inner surface LS3 and the inner surface 20S of the hole VA, the inner surface LS1 of the hole VB and the inner surface OS of the hole VC, and the inner surface LS2 of the hole VD and the upper surface LT1 of the first conductive layer.

The connecting material C1 electrically connects the first conductive layer L1 and the second conductive layer L2 to the third conductive layer L3 via the hole VA. For example, the connecting material C1 is provided without being interrupted on the inner surface of the contact hole V1 (the holes VA, VB, VC and VD, and the recess CC), and electrically connects the first conductive layer L1 and the second conductive layer L2 to the third conductive layer L3. In the example illustrated in the drawing, the connecting material C1 contacts each of the upper surface LT3 of the third conductive layer L3, the inner surface LS3 of the third conductive layer L3 in the hole VA, and the inner surface 20S of the second basement 20 in the hole VA, in the second substrate SUB2. The connecting material C1 contacts the inner surface OS of the organic insulating layer OI in the hole VC. In addition, the connecting material C1 also contacts each of the inner surface LS2 of the second conductive layer L2 in the hole VD, the upper surface LT1 of the first conductive layer in the hole VD, the inner surface LS1 of the first conductive layer L1 in the hole VB, and the recess CC, in the first substrate SUB1. It should be noted that the connecting material C1 may be filled so as to fill the inside of the contact hole V1. In addition, the connecting material C1 may contact at least the second conductive layer L2 and the third conductive layer L3.

The connecting material C1 contacts the inner surface LS2 of the second conductive layer L2 in the hole VD in addition to the upper surface LT3 and the inner surface LS3 of the third conductive layer L3 in the hole VA, the upper surface LT1 of the first conductive layer L1 in the hole VD, and the inner surface LS1 of the first conductive layer L1 in the hole VB. Thus, the connecting material C1 forms a path to electrically connect the first conductive layer L1 and the third conductive layer L3 via the second conductive layer L2 in contact with the upper surface LT2 of the first conductive layer L1 in addition to a path to electrically connect the first conductive layer L1 and the third conductive layer L3. That is, the connecting material C1 can substantially expand a contact area with the first conductive layer L1 by contacting the second conductive layer L2, and suppress connection failure between the first conductive layer L1 and the third conductive layer L3. It should be noted that the substantial contact area of the connecting material C1 with the first conductive layer L1 increases in proportion to the contact area with the second conductive layer L2. That is, the substantial contact area of the connecting material C1 with the first conductive layer L1 increases in proportion to an exposed area thereof in the contact hole V1. In the example illustrated in the drawing, the substantial contact area of the connecting material C1 with the first conductive layer L1 increases in proportion to the thickness of the second conductive layer L2 in the third direction Z.

As a result, the third conductive layer L3 is electrically connected to the wiring board SUB3 via the connecting material C1 with the first conductive layer L1 and the second conductive layer L2. Thus, a control circuit configured to write a signal to the third conductive layer L3 and read a signal output from the third conductive layer L3 can be connected to the third conductive layer L3 via the wiring board SUB3. As a result, it is not necessary to mount the wiring board over the second substrate SUB2 in order to connect the third conductive layer L3 and the control circuit.

In the above description, the contact hole V1 among the plurality of contact holes V formed in the display device DSP has been described. The same configuration can be also applied to the other contact holes (V2, V3, V4, and so on) among the plurality of contact holes V, and thus, the detailed description thereof will be omitted.

According to the display device DSP including the sensor SS described above, the detection electrode Rx provided in the second substrate SUB2 is connected to the pad P provided over the first substrate SUB1 using the connecting material C provided in the contact hole V. Thus, it is unnecessary to mount the wiring board configured to connect the detection electrode Rx and the detection circuit RC over the second substrate SUB2. That is, the wiring board SUB3 mounted over the first substrate SUB1 forms a transmission path configured to transmit a signal necessary for display of an image on the display panel PNL, and forms a transmission path configured to transmit a signal between the detection electrode Rx and the detection circuit RC. Therefore, it is possible to reduce the number of wiring boards and to reduce cost as compared to the configuration example in which a separate wiring board is required in addition to the wiring board SUB3. In addition, the space for connecting the wiring board to the second substrate SUB2 is unnecessary, and thus, it is possible to reduce a width of the non-display area of the display panel PNL, and particularly, an edge side on which the wiring board SUB3 is mounted. This makes it possible to narrow the frame and reduce the cost.

According to the embodiment, the connecting material C, configured to electrically connect the pad P (for example, the pad P1 (the first conductive layer L1)) provided on the upper surface of the first substrate SUB1 and the detection electrode Rx (for example, the detection electrode Rx1 (the third conductive layer L3)) provided on the upper surface of the second substrate SUB2, is provided inside the contact hole V, in the display device DSP. In the first substrate SUB1, the second conductive layer (for example, the second conductive layer L2) is located on the pad P and contacts the pad P in order to expand the substantial contact area between the connecting material C and the pad P. The second conductive layer is exposed to the inner surface of the contact hole V (for example, the contact hole V1). Thus, the connecting material C is provided without being interrupted on the inner surface of the contact hole V, thereby electrically connecting the pad P and the detection electrode Rx via the second conductive layer L2. That is, the connecting material C can expand the contact area with the first conductive layer by contacting the second conductive layer in the contact hole V. Thus, it is possible to suppress the connection failure between the pad P and the detection electrode Rx. As a result, it is possible to provide the display device DSP capable of narrowing the frame and improving the reliability.

Next, an example of a method of manufacturing the above-described display device DSP will be described with reference to FIGS. 7A to 7H, 8A to 8C, 9A and 9B. Hereinafter, the example of the method of manufacturing the display device DSP will be described using a cross-sectional view of the display panel PNL in a portion where the contact hole V1 among the plurality of contact holes V is formed as an example, for convenience of description.

Figure 7B:
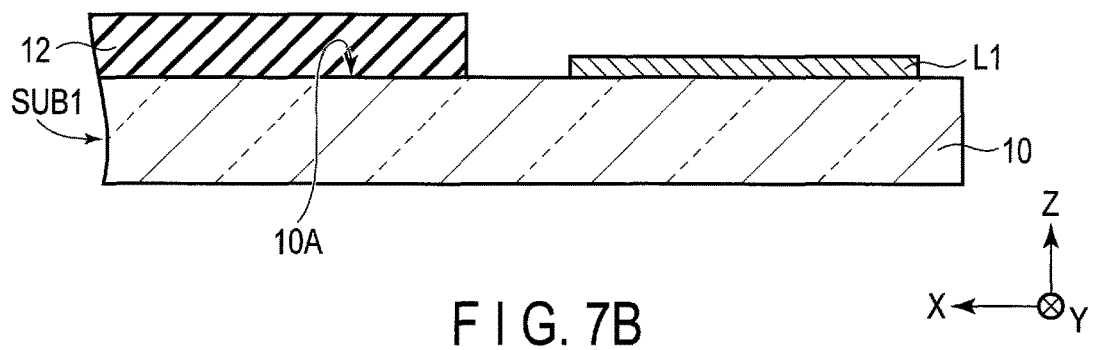
FIG. 7B is a view for describing an example of the method of manufacturing the display device according to the embodiment.
Figure 7C:
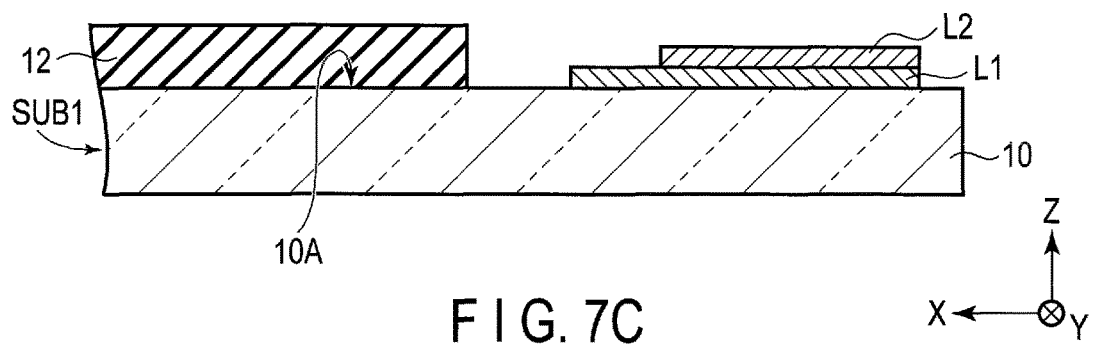
FIG. 7C is a view for describing an example of the method of manufacturing the display device according to the embodiment.

First, the first substrate SUB1 in which the first conductive layer L1, the second insulating layer 12, and the like are formed on the surface 10A of the first basement 10 is prepared as shown in FIG. 7A. Next, as shown in FIG. 7B, a part of the second insulating layer 12 is removed at an end of the first basement 10 in the first direction X to expose the first conductive layer L1 in the first substrate SUB1 shown in FIG. 7A. Subsequently, the second conductive layer L2 is formed over the first conductive layer L1 exposed in FIG. 7B by inkjet or the like as shown in FIG. 7C. Next, after forming the second conductive layer L2 over the first conductive layer L1 in FIG. 7C, the seal SE is formed by inkjet or the like so as to cover the first conductive layer L1 and the second conductive layer L2 on the surface 10A of the first basement 10 and a part thereof is located on the second insulating layer 12 as shown in FIG. 7D.

Figure 7D:
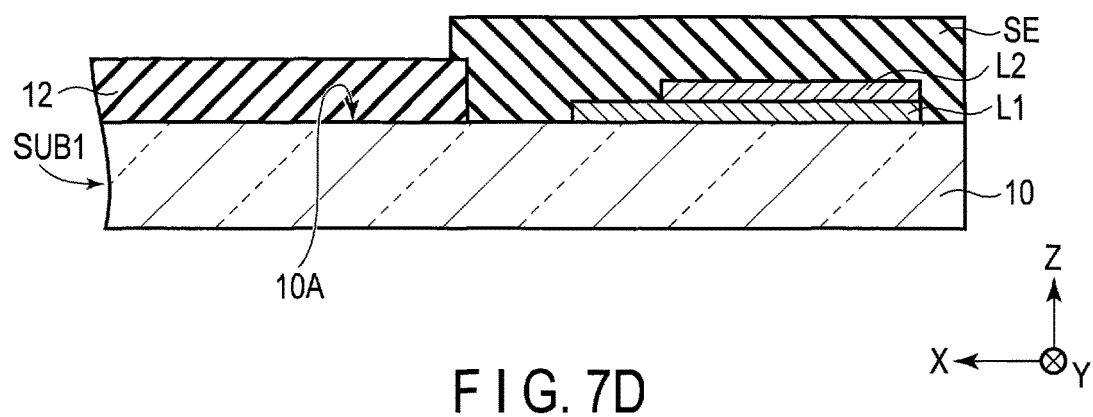
FIG. 7D is a view for describing an example of the method of manufacturing the display device according to the embodiment.
Figure 7E:
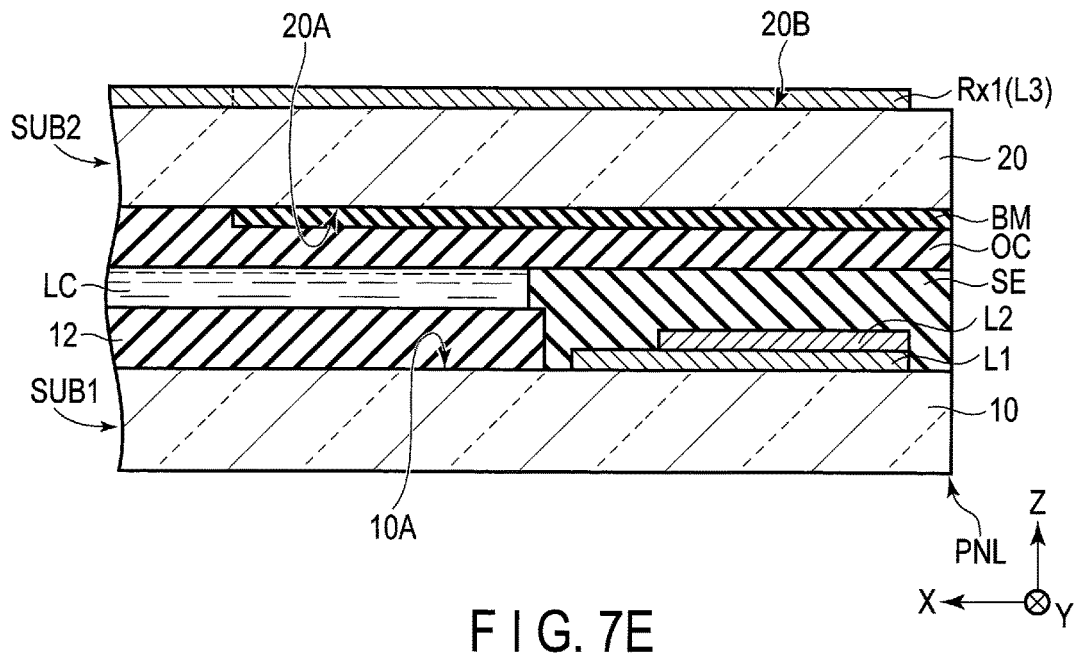
FIG. 7E is a view for describing an example of the method of manufacturing the display device according to the embodiment.

Next, the second substrate SUB2 in which the light shielding layer BM, the overcoat layer OC, and the like are formed over the surface 20A of the second basement 20 is prepared as shown in FIG. 7E. At this point in time, the third conductive layer L3 is not formed over the surface 20B of the second substrate SUB2. The liquid crystal material is dropped inside the seal SE of the first substrate SUB1 shown in FIG. 7D. Thereafter, the first substrate SUB1 and the second substrate SUB2 are bonded to each other, and the seal SE is cured, thereby attaching the first substrate SUB1 and the second substrate SUB2 to each other. Thereafter, each of the first basement 10 and the second basement 20 is subjected to etching using an etchant such as hydrofluoric acid HF (HF) to thin the first basement 10 and the second basement 20. Thereafter, the third conductive layer L3 is formed over the surface 20B of the second basement 20.

The method of manufacturing the display panel PNL shown in FIGS. 7D and 7E is an example, and the display panel PNL may be manufactured using another manufacturing method. For example, the seal SE may be formed over the surface 20A of the second basement 20 instead of forming the seal SE over the surface 10A of the first basement 10. In addition, the third conductive layer L3 may be formed in advance in the second substrate SUB2 before bonding the first substrate SUB1 and the second substrate SUB2 by curing the seal in FIG. 7E.

Figure 7F:
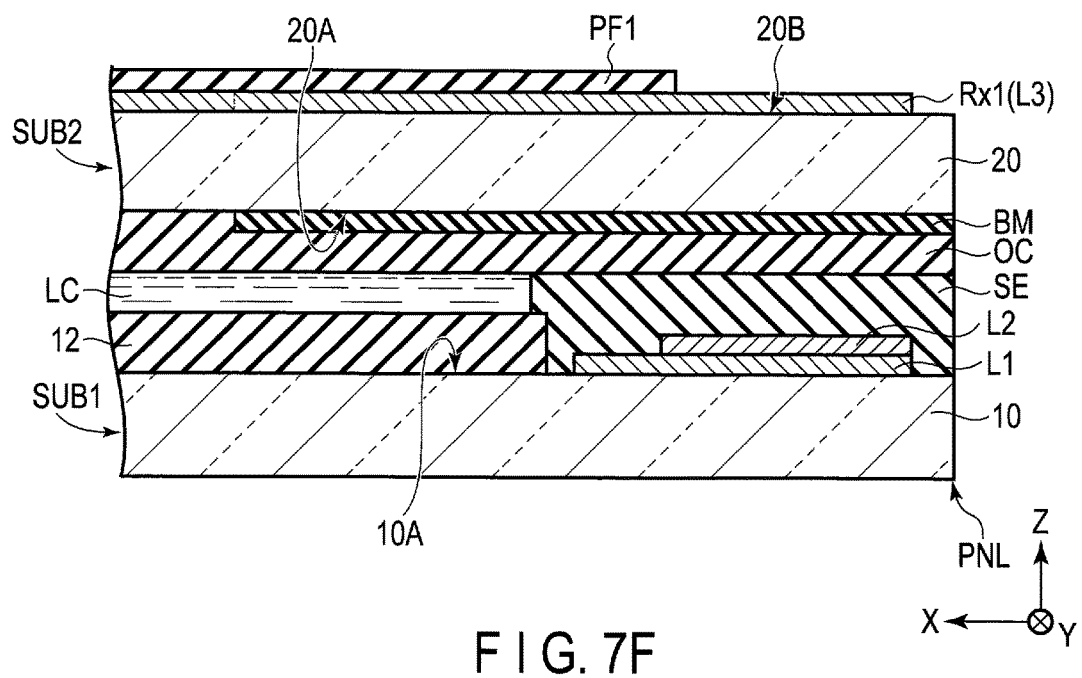
FIG. 7F is a view for describing an example of the method of manufacturing the display device according to the embodiment.

Next, as shown in FIG. 7F, the protective material PF1 is formed over the third conductive layer L3 of the second substrate SUB2 shown in FIG. 7E. In the example illustrated in the drawing, the protective material PF1 is not located above the first conductive layer L1 and the second conductive layer L2 at the end of the third conductive layer L3 in the first direction X. Thus, the end of the third conductive layer L3 is exposed.

Figure 7G:
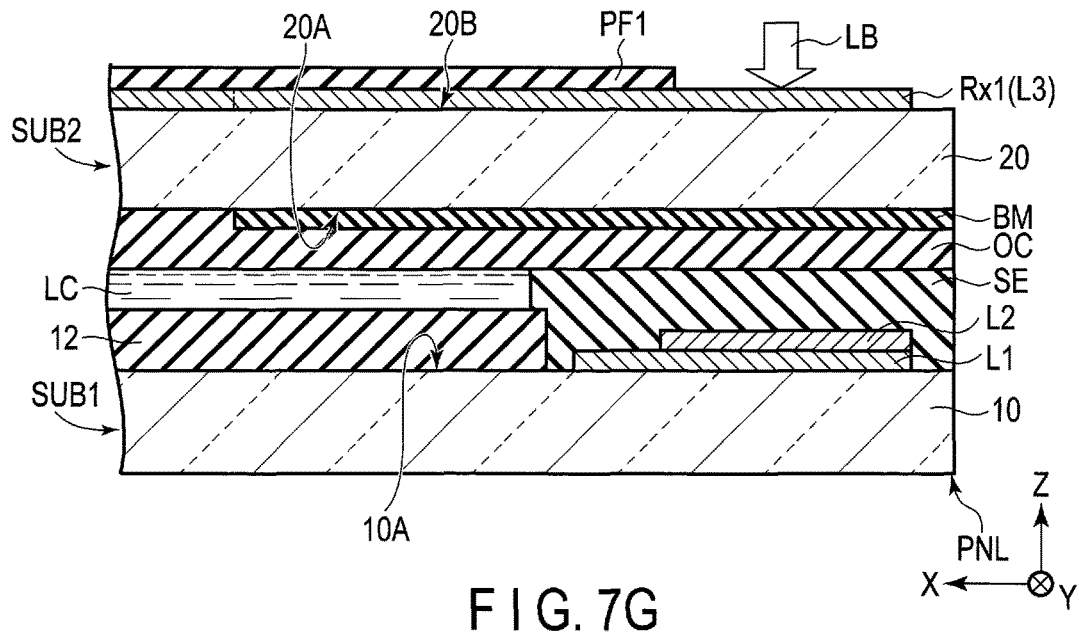
FIG. 7G is a view for describing an example of the method of manufacturing the display device according to the embodiment.

Subsequently, the second substrate SUB2 is irradiated with laser beam LB as shown in FIG. 7G. In the example illustrated in the drawing, the laser beam LB is emitted from above the third conductive layer L3. For example, it is possible to apply a carbon dioxide gas laser device or the like as a laser beam source, but any material can be used as long as drilling can be performed on a glass material and an organic material, and an excimer laser device or the like is also applicable.

Figure 7H:
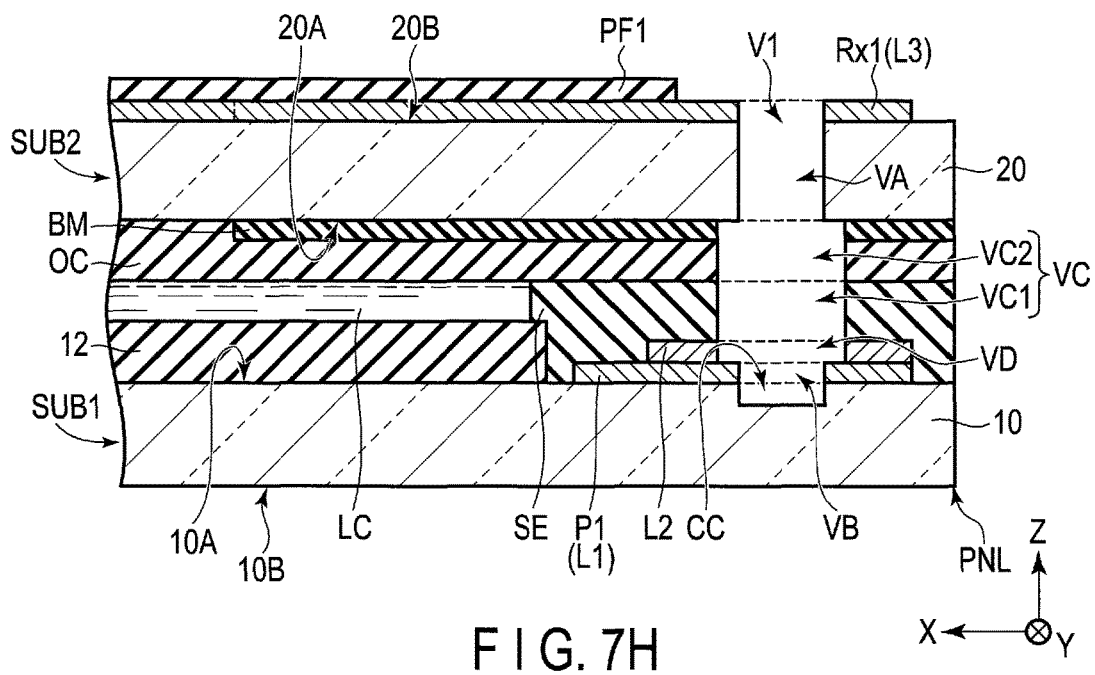
FIG. 7H is a view for describing an example of the method of manufacturing the display device according to the embodiment.

Through such irradiation with the laser beam LB, the hole VA penetrating the second basement 20 and the third conductive layer L3 is formed as shown in FIG. 7H. In addition, the second portion VC2 of the hole VC penetrating the light shielding layer BM and the overcoat layer OC located immediately below the hole VA, the first portion VC1 of the hole VC penetrating the seal SE located immediately below the second portion VC2, the hole VD penetrating the second conductive layer L2 located immediately below the first portion VC1, and the hole VB penetrating the first conductive layer L1 located immediately below the hole VD are formed when being irradiated with the laser beam LB in the example illustrated in the drawing. At this time, the recess CC of the first basement 10 located immediately below the hole VB is also formed at the same time. Accordingly, the contact hole V1 configured to connect the first conductive layer L1 and the second conductive layer L2 to the third conductive layer L3 is formed.

Figure 8A:
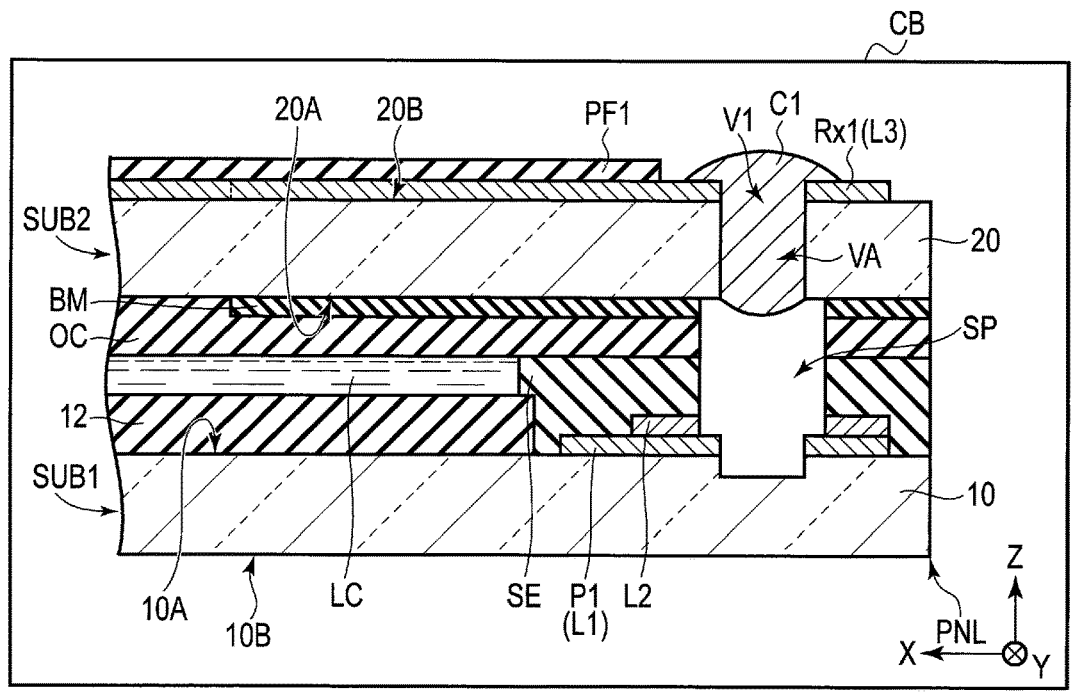
FIG. 8A is a view for describing an example of the method of manufacturing the display device according to the embodiment.

Subsequently, the connecting material C1 which electrically connects the first conductive layer L1 and the second conductive layer L2 to the third conductive layer L3 is formed as shown in FIG. 8A.

More specifically, the display panel PNL is first installed inside a chamber CB, and then, air inside the chamber CB is discharged, and the connecting material C1 is injected into the hole VA in vacuum (under environment with an air pressure lower than the atmospheric pressure) as shown in FIG. 8A. At this time, there is a case where the connecting material C1 does not flow into the second conductive layer L2 or the first conductive layer L1, and a space SP is formed between the connecting material C1 and the second conductive layer L2 or the first conductive layer L1. However, the space SP is in vacuum.

Figure 8B:
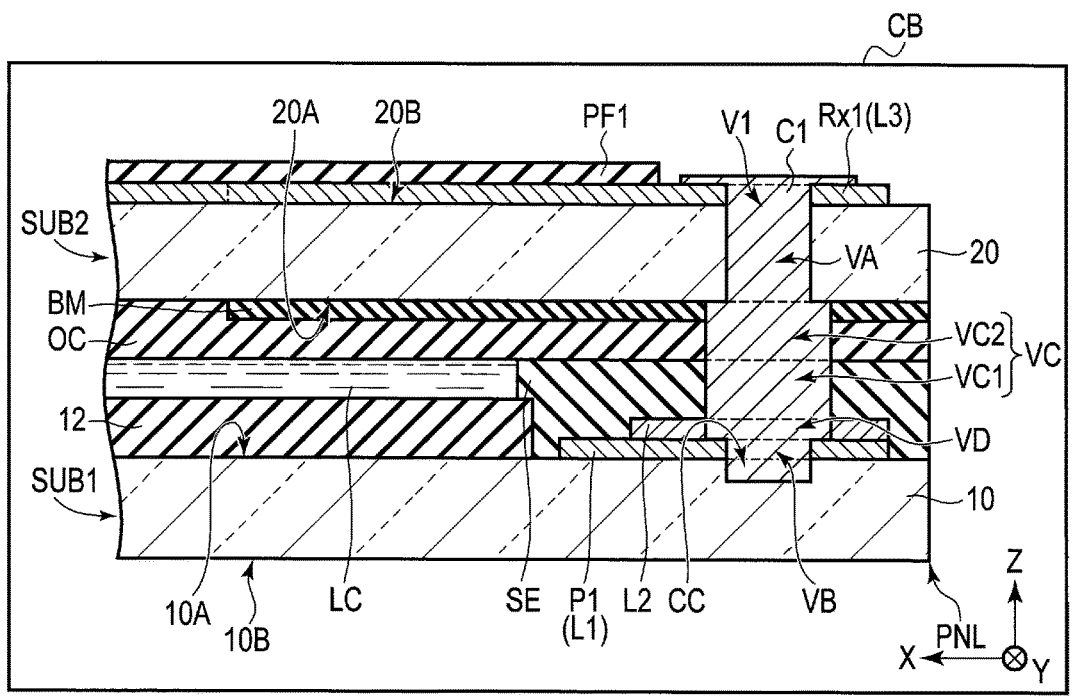
FIG. 8B is a view for describing an example of the method for manufacturing the display device according to the embodiment.

Thereafter, the degree of vacuum is lowered by introducing a gas such as air and an inert gas into the chamber CB such that the connecting material C1 flows into the holes VC, VD and VB, and the recess CC from the hole VA due to a pressure difference between the space SP and the periphery of the display panel PNL, and the connecting material C1 contacts the first conductive layer L1 and the second conductive layer L2 as shown in FIG. 8B.

Figure 8C:
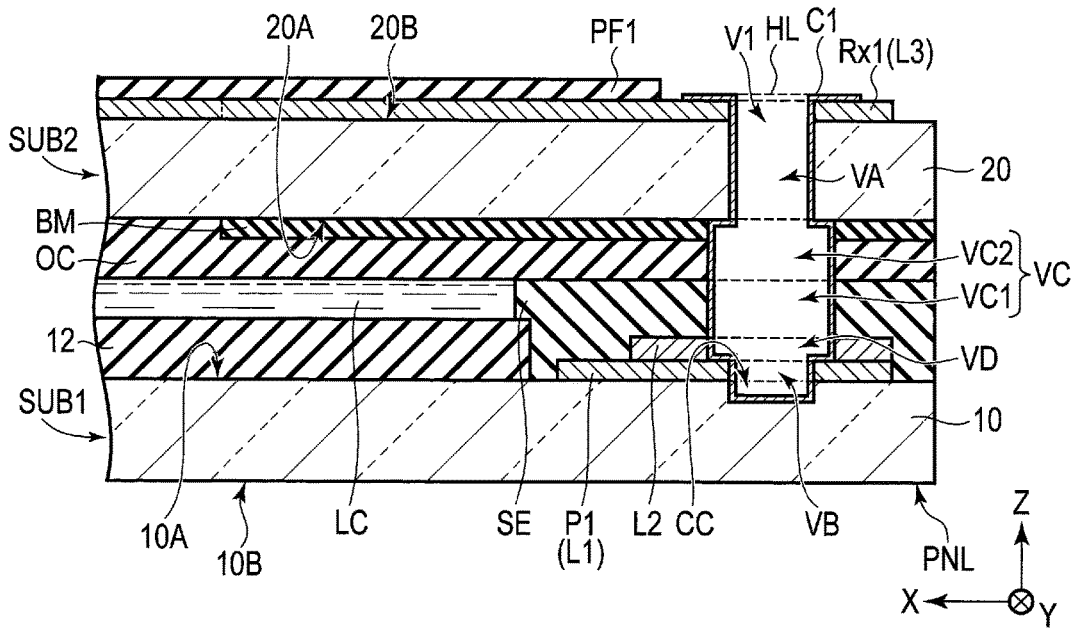
FIG. 8C is a view for describing an example of the method of manufacturing the display device according to the embodiment.

Thereafter, a solvent contained in the connecting material C1 is removed so that the volume of the connecting material C1 is reduced and a hollow portion HL is formed as shown in FIG. 8C. The connecting material C1 formed in this manner contacts each of the third conductive layer L3 and the second basement 20 in the hole VA, contacts each of the light shielding layer BM, the overcoat layer OC, the seal SE, and the second insulating layer 12 in the hole VC, contacts the second conductive layer L2 in the hole VD, contacts the first conductive layer L1 in the hole VB, and contacts the first basement 10 in the recess CC.

It should be noted that the method of forming the connecting material C1 which has been described with reference to FIGS. 8A to 8C is merely an example, and the method is not limited thereto. For example, even in a method of removing the solvent contained in the connecting material C1 after injecting the connecting material C1 into the hole VA under the atmospheric pressure, it is possible to form the same connecting material C1 as described above.

Figure 9A:
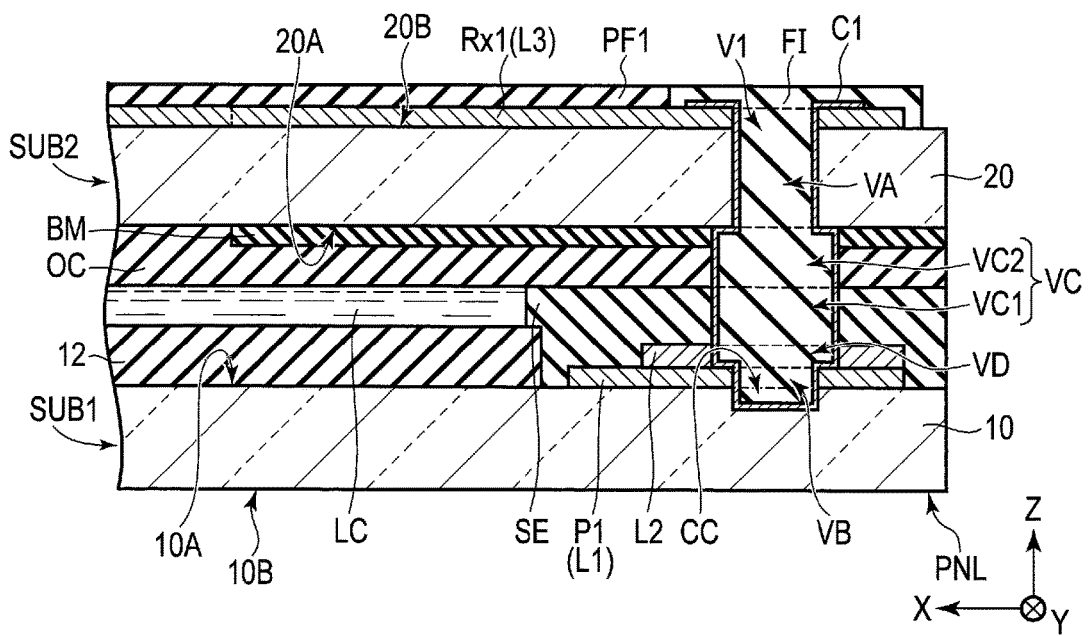
FIG. 9A is a view for describing an example of the method for manufacturing the display device according to the embodiment.

Subsequently, the filler FI is filled in the hollow portion HL as shown in FIG. 9A. In the example illustrated in the drawing, the filler FI is filled in the hollow portion HL of the connecting material C and is located over the surface 20B of the second basement 20, the third conductive layer L3, and the connecting material C1.

Figure 9B:
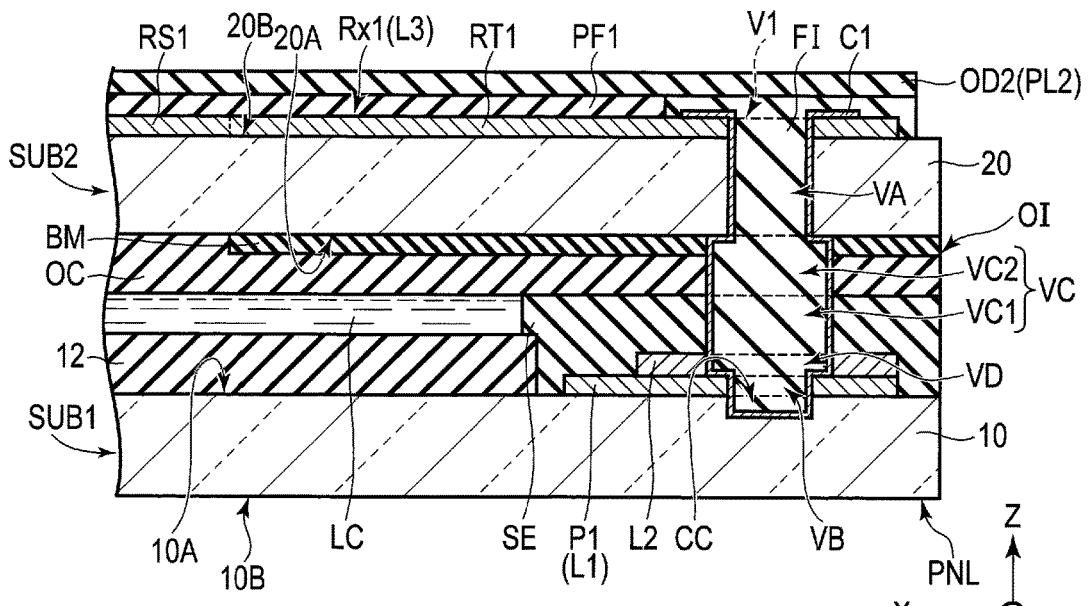
FIG. 9B is a view for describing an example of the method of manufacturing the display device according to the embodiment.

Subsequently, the second optical element OD2 is attached to the protective material PF1 and the filler FI as shown in FIG. 9B. In the example illustrated in the drawing, the second optical element OD2 also extends to a portion overlapping the contact hole V1. Since the filler FI is located over the third conductive layer L3 and the connecting material C1, a step caused by the contact hole V1 is alleviated. Thus, it is possible to suppress peeling of the second optical element OD2 caused by the step of the basement of the second optical element OD2 at the time of bonding the second optical element OD2. Although the cross-sectional view of the panel PNL in the portion where the contact hole V1 is formed has been described as an example in the method of manufacturing the display device DSP described above, the same manufacturing method as the portion where the contact hole V1 is formed can be also applied to the other portions where the other contact holes V2, V3, and so on among the contact holes V are formed.

As described above, it is possible to provide the display device capable of narrowing the frame and reducing the cost, and the manufacturing method thereof according to the embodiment.

Next, other configuration examples of the embodiment will be described with reference to FIGS. 10 to 13, respectively. In the other configuration examples of the embodiment to be described hereinafter, the same parts as those in the above-described embodiment will be denoted by the same reference numerals, and the detailed description thereof is omitted. A description will be given in detail focusing on parts different from the above-described embodiment. It should be noted that the same effects as in the above-described embodiment can be also obtained in the other embodiments.

Figure 10:
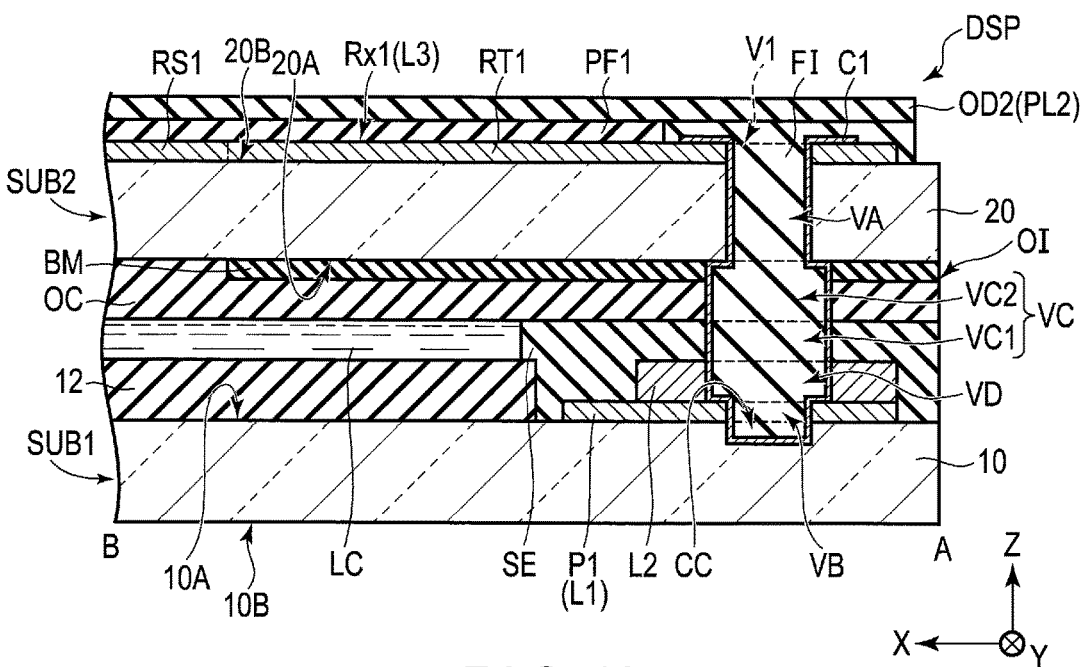
FIG. 10 is a cross-sectional view illustrating another configuration example of the display device according to the embodiment.

The configuration example illustrated in FIG. 10 is different from the configuration example illustrated in FIG. 5 in terms that a stacked thickness of a first conductive layer L1 and a second conductive layer L2 is substantially the same as a thickness of a second insulating layer 12 in a third direction Z. In the example illustrated in the drawing, the second conductive layer L2 is located over the first conductive layer L1. A thickness T2 of the second conductive layer L2 is greater than a thickness T1 of the first conductive layer L1. Even in such a configuration example, the same effects as described above can be obtained. In addition, it is possible to expand a contact area between a connecting material C and the second conductive layer L2 as compared to the above-described embodiment, and thus, it is possible to improve the reliability.

Figure 11:
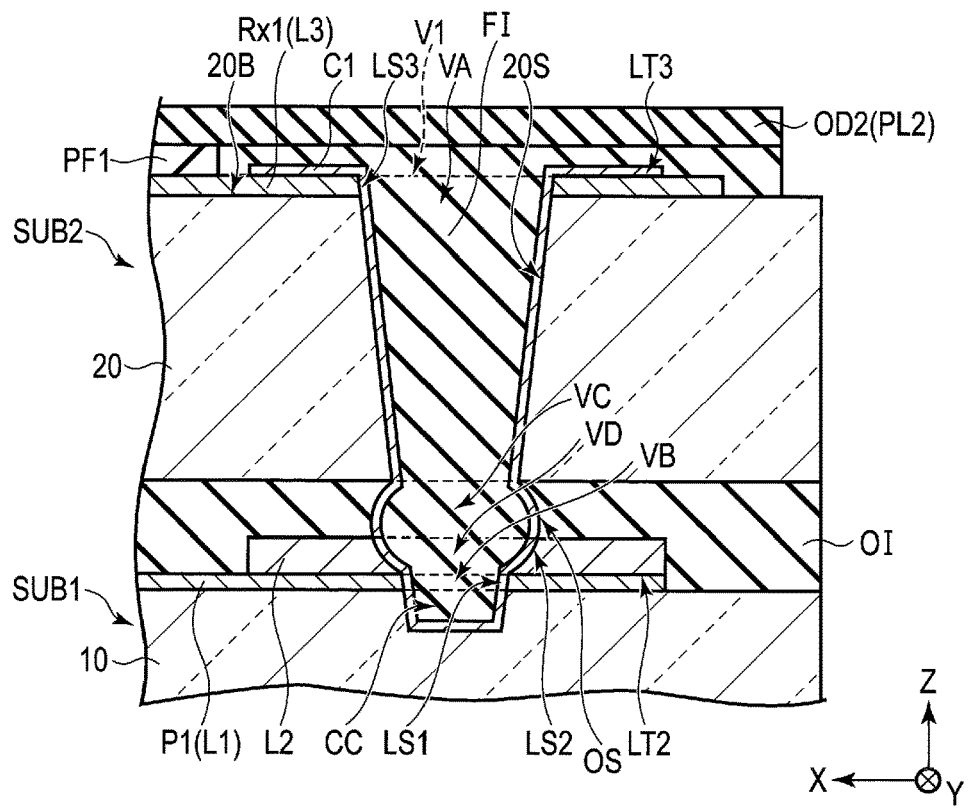
FIG. 11 is an enlarged cross-sectional view illustrating another configuration example of the display device according to the embodiment.

The configuration example illustrated in FIG. 11 is different from the configuration example illustrated in FIG. 6 in terms that an upper surface LT1 of a first conductive layer L1 is not exposed in a contact hole V1. A second conductive layer L2 is also located over the upper surface LT1 of the first conductive layer L1 shown in FIG. 6. A connecting material C contacts an inner surface LS3 of the second conductive layer L2 and an inner surface LS1 of the first conductive layer L1 in the contact hole V1. Even in such a configuration example, the same effects as described above can be obtained. In addition, even when the upper surface LT1 of the first conductive layer L1 is not exposed in a hole VD, the connecting material C can electrically connect the first conductive layer L1 and a third conductive layer L3 through the second conductive layer L2.

Figure 12:
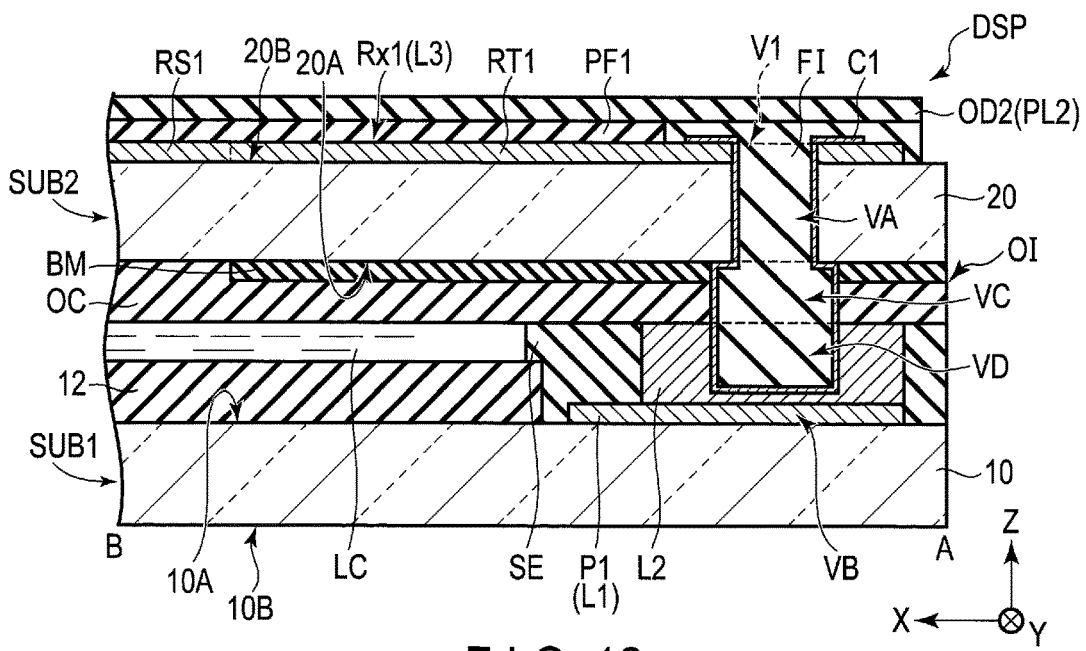
FIG. 12 is a cross-sectional view illustrating another configuration example of the display device according to the embodiment.

The configuration example illustrated in FIG. 12 is different from the configuration example illustrated in FIG. 5 in terms that a contact hole V1 does not penetrate a second conductive layer L2 in a display device DSP. For example, a stacked thickness of a first conductive layer L1 and the second conductive layer L2 is substantially the same as a thickness of a seal SE in a third direction Z. In the example illustrated in the drawing, the second conductive layer L2 is located over the first conductive layer L1. A thickness T2 of the second conductive layer L2 is greater than a thickness T1 of the first conductive layer L1. Even in such a configuration example, the same effects as described above can be obtained. In addition, it is possible to expand a contact area between the connecting material C and the second conductive layer L2 as compared to the above-described embodiment, and thus, it is possible to improve the reliability.

The configuration example illustrated in FIG. 13 is different from the configuration example illustrated in FIG. 5 in terms that a connecting material C is provided on each inner surface of holes VA, VB and VC and a recess CC, and a hollow portion of the connecting material C is filled with a conductive filler FM. The filler FM is obtained, for example, by curing a paste containing conductive particles such as silver. In the example illustrated in the drawing, a second substrate SUB2 further includes a protective material PF2. The protective material PF2 is partly located on the connecting material C1 and the filler FM on a surface 20B side, and partly located on a third conductive layer L3 and the surface 20B. For example, the protective material PF2 is formed using an organic insulating material such as acrylic resin, which is similar to a protective material PF1. It should be noted that the protective materials PF1 and PF2 may be integrally formed. Even in such a configuration example, the same effects as described above can be obtained. In addition, the filler FM can electrically connect the first conductive layer L1 and the second conductive layer L2 even if the connecting material C is interrupted, and it is possible to improve the reliability. In addition, it is possible to alleviate a step in a third direction Z caused by formation of a hollow portion in the connecting material C.

An example of the display device obtained from the configuration disclosed in this specification is appended below.

(1) An electronic device comprising:
a first substrate which comprises a first basement, a first conductive layer, and a second conductive layer in contact with the first conductive layer;
a second substrate which comprises a second basement opposed to the first conductive layer and separated from the first conductive layer, a third conductive layer, and a first hole penetrating the second substrate; and
a connecting material which electrically connects the second conductive layer and the third conductive layer via the first hole and directly contacts the second conductive layer.

(2) The electronic device according to (1), in which
the second conductive layer comprises a second hole opposed to the first hole of the second substrate, and
the connecting material electrically connects the first conductive layer and the third conductive layer via the first hole and the second hole.

(3) The electronic device according to (2), in which
the connecting material contacts an inner surface of the second conductive layer in the second hole.

(4) The electronic device according to (2) or (3), in which
the first conductive layer comprises a third hole led to the second hole.

(5) The electronic device according to (4), in which
the connecting material contacts an inner surface of the first conductive layer in the third hole.

(6) The electronic device according to (4) or (5), in which
the first basement comprises a recess led to the third hole.

(7) The electronic device according to (6), in which
the connecting material contacts the recess.

(8) The electronic device according to (7), further comprising
an organic insulating layer which is located between the first basement and the second basement,
in which the organic insulating layer comprises a fourth hole led to the first hole and the second hole, and covers the second conductive layer.

(9) The electronic device according to (8), in which
the organic insulating layer comprises a first organic insulating layer provided in the first substrate, and
the fourth hole comprises a first portion penetrating the first organic insulating layer.

(10) The electronic device according to (9), in which
the first organic insulating layer covers the first conductive layer and the second conductive layer.

(11) The electronic device according to (10), in which
the first organic insulating layer is a seal which bonds the first substrate and the second substrate.

(12) The electronic device according to (11), in which
the first conductive layer is located over the first basement, and
the second conductive layer is located over the first conductive layer, and is opposed to a second surface opposite to a first surface,
the third conductive layer of the second substrate is provided on the first surface.

(13) The electronic device according to (12), in which
the first conductive layer comprises the third hole having a smaller diameter than the second hole,
an upper surface of the first conductive layer is exposed in the second hole, and
the connecting material contacts the upper surface of the first conductive layer.

(14) The electronic device according to any one of (2) to (11), in which
the second conductive layer comprises the second hole having a larger diameter than the first hole.

(15) The electronic device according to any one of (1) to (14), in which
a thickness of the second conductive layer is greater than a thickness of the first conductive layer.

(16) The electronic device according to any one of (1) to (15), in which
the second conductive layer comprises silver or an alloy containing silver.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a first substrate which comprises a first basement, a first conductive layer, and a second conductive layer in contact with the first conductive layer;
a second substrate which comprises a second basement opposed to the first conductive layer and separated from the first conductive layer, a third conductive layer, and a first hole penetrating the second substrate; and
a connecting material which electrically connects the second conductive layer and the third conductive layer via the first hole and directly contacts the second conductive layer, wherein
the second conductive layer comprises a second hole opposed to the first hole of the second substrate,
the connecting material electrically connects the first conductive layer and the third conductive layer via the first hole and the second hole,
the first conductive layer comprises a third hole led to the second hole, and
the first basement comprises a recess led to the third hole.

2. The electronic device according to Claim 1, wherein the connecting material contacts an inner surface of the second conductive layer in the second hole.

3. The electronic device according to claim 1, wherein the connecting material contacts an inner surface of the first conductive layer in the third hole.

4. The electronic device according to claim 1, wherein the connecting material contacts the recess.

5. The electronic device according to claim 4, further comprising
an organic insulating layer which is located between the first basement and the second basement,
wherein the organic insulating layer comprises a fourth hole led to the first hole and the second hole, and covers the second conductive layer.

6. The electronic device according to claim 5, wherein the organic insulating layer comprises a first organic insulating layer provided in the first substrate, and
the fourth hole comprises a first portion penetrating the first organic insulating layer.

7. The electronic device according to claim 6, wherein the first organic insulating layer covers the first conductive layer and the second conductive layer.

8. The electronic device according to claim 7, wherein the first organic insulating layer is a seal which bonds the first substrate and the second substrate.

9. The electronic device according to claim 8, wherein the first conductive layer is located over the first basement, and
the second conductive layer is located over the first conductive layer, and is opposed to a second surface opposite to a first surface,
the third conductive layer of the second substrate is provided on the first surface.

10. The electronic device according to claim 9, wherein the first conductive layer comprises the third hole having a smaller diameter than the second hole,
an upper surface of the first conductive layer is exposed in the second hole, and
the connecting material contacts the upper surface of the first conductive layer.

11. The electronic device according to claim 1, wherein the second conductive layer comprises the second hole having a larger diameter than the first hole.

12. The electronic device according to claim 1, wherein a thickness of the second conductive layer is greater than a thickness of the first conductive layer.

13. The electronic device according to claim 1, wherein the second conductive layer comprises silver or an alloy containing silver.

* * * * *